(12) United States Patent
Dreyer et al.

(10) Patent No.: US 12,742,111 B2
(45) Date of Patent: Sep. 22, 2026

(54) CORROSION-INHIBITING AGENTS FOR REDUCING DISSOLVED OXYGEN CONCENTRATIONS WITHIN UPSTREAM OILFIELD SYSTEMS

(71) Applicant: Finoric LLC, Beasley, TX (US)

(72) Inventors: Daniel R. Dreyer, Rosenberg, TX (US); Pious Kurian, Sugar Land, TX (US); Michael Lantz, Golden, CO (US); Ambrish Kamdar, Sugar Land, TX (US)

(73) Assignee: Finoric LLC, Beasley, TX (US)

( * ) Notice: Subject to any disclaimer, the term of this patent is extended or adjusted under 35 U.S.C. 154(b) by 0 days.

(21) Appl. No.: 19/201,133

(22) Filed: May 7, 2025

(65) Prior Publication Data

US 2025/0354049 A1 Nov. 20, 2025

Related U.S. Application Data

(60) Provisional application No. 63/647,499, filed on May 14, 2024.

(51) Int. Cl.
*C09K 8/54* (2006.01)
*E21B 37/06* (2006.01)

(52) U.S. Cl.
CPC ................ *C09K 8/54* (2013.01); *E21B 37/06* (2013.01); *C09K 2208/32* (2013.01)

(58) Field of Classification Search
CPC ........................................................ C09K 8/74
See application file for complete search history.

(56) References Cited

U.S. PATENT DOCUMENTS 4,539,122 A * 9/1985 Son .......................... C09K 8/54 507/260
2010/0099584 A1* 4/2010 Mesher .................... C09K 8/74 507/90
2011/0100630 A1* 5/2011 Evans ..................... C23F 11/04 166/305.1

* cited by examiner

*Primary Examiner* — William D Hutton, Jr.
*Assistant Examiner* — Avi T Skaist

(57) ABSTRACT

Various embodiments of the present technology generally relate to systems and methods for inhibiting corrosion to metal infrastructure within upstream oilfield systems. In an example, a method for inhibiting corrosion of metal infrastructure within a wellbore includes providing a corrosion-inhibiting agent and dissolving the corrosion-inhibiting agent in a solvent to form a corrosion-inhibiting solution. In various aspects, the corrosion-inhibiting agent may be organic and/or sulfur-free. The corrosion-inhibiting solution may be injected into a wellbore where the corrosion-inhibiting solution reduces an oxygen concentration within the wellbore to below 1 parts-per-million (ppm) and achieves a corrosion rate of equal to or less than 0.02 lb/ft$^2$.

19 Claims, 11 Drawing Sheets

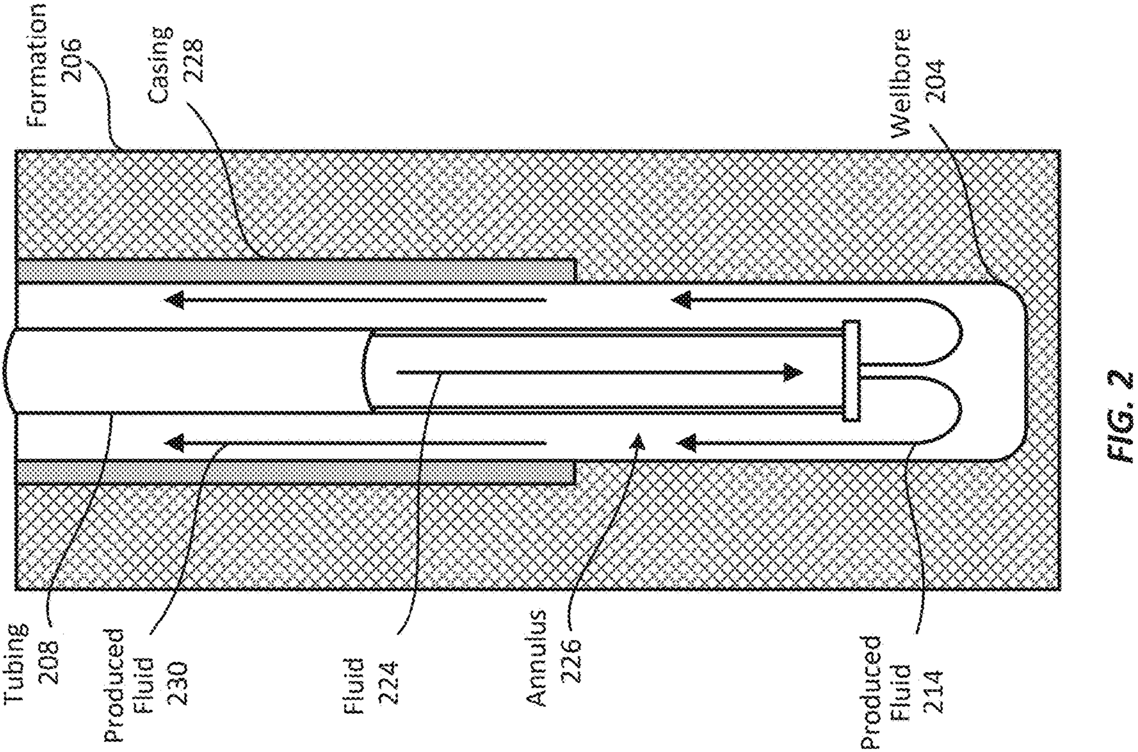
FIG. 2

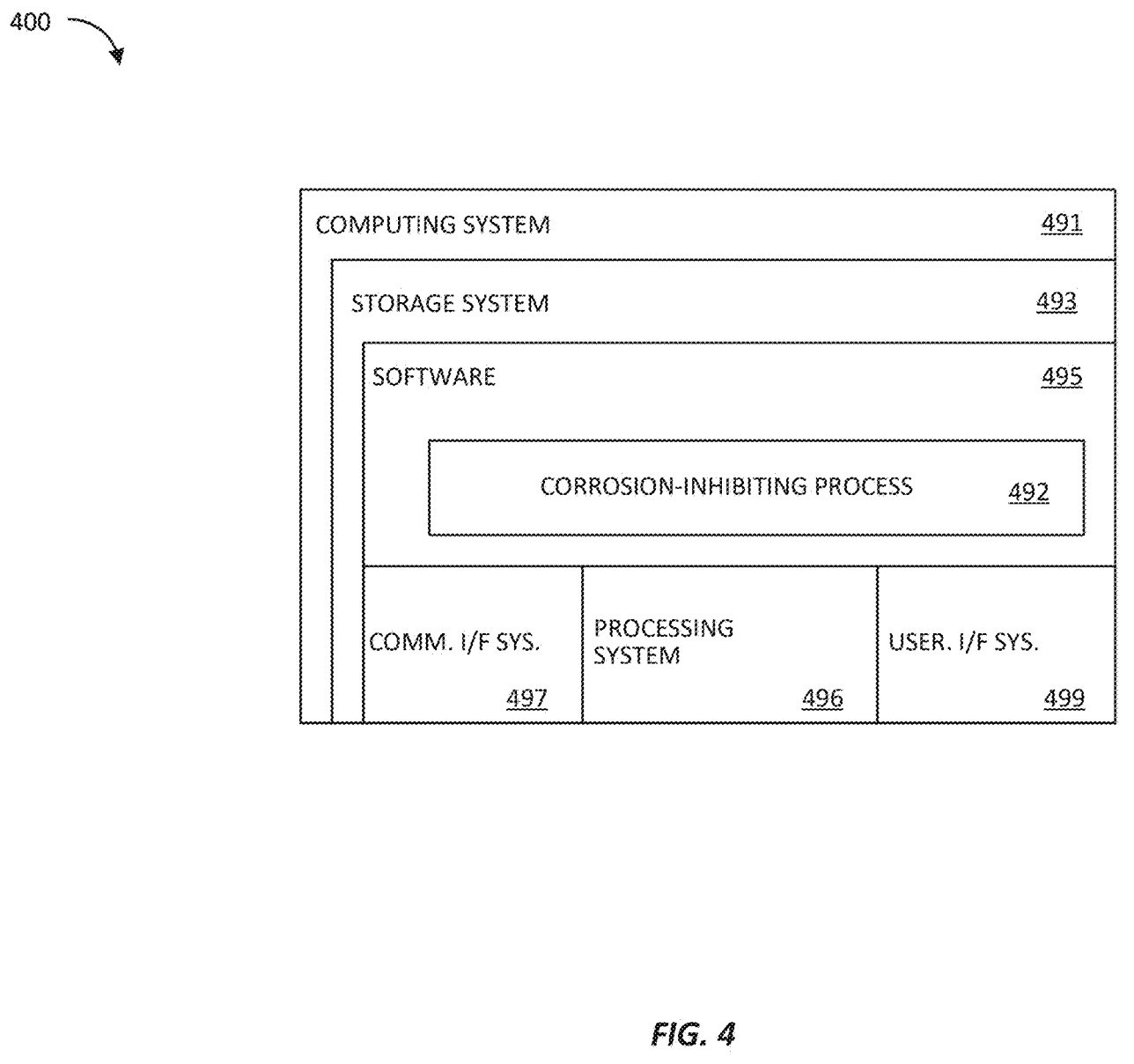

400

COMPUTING SYSTEM 491

STORAGE SYSTEM 493

SOFTWARE 495

CORROSION-INHIBITING PROCESS 492

COMM. I/F SYS. 497

PROCESSING SYSTEM 496

USER. I/F SYS. 499

FIG. 4

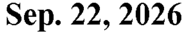
FIG. 5

800

900

1000

1100

CORROSION-INHIBITING AGENTS FOR REDUCING DISSOLVED OXYGEN CONCENTRATIONS WITHIN UPSTREAM OILFIELD SYSTEMS

CROSS REFERENCE TO RELATED APPLICATION

This application claims priority to and the benefit of U.S. Provisional Patent Application No. 63/647,499, titled "CORROSION-INHIBITING AGENTS FOR REDUCING DISSOLVED OXYGEN CONCENTRATIONS WITHIN UPSTREAM OILFIELD SYSTEMS," filed May 14, 2024, the contents of which is incorporated herein by reference in its entirety for all purposes.

TECHNICAL FIELD

Various embodiments of the present technology generally relate to upstream petrochemical systems and equipment. More specifically, embodiments of the present technology relate to systems and methods for inhibiting or limiting corrosion of metal infrastructures within upstream oil systems, such as wellbores upon completion and during production.

BACKGROUND

Corrosion poses a significant challenge within upstream oil systems, particularly in critical components such as wellbores. A common source or instigator of corrosion is oxygen, which can infiltrate oil systems through various pathways, including atmospheric ingress during maintenance activities or dissolved oxygen present in produced fluids or fluids used during completion, stimulation, and/or production processes. When oxygen interacts with metal surfaces in wellbores, it initiates oxidative corrosion processes, leading to the degradation of infrastructure integrity. This corrosion, whether in the form of general corrosion, pitting corrosion, or stress corrosion cracking, can result in structural degradation, equipment failure, leaks, and environmental contamination. Left unchecked, corrosion can result in costly repairs, production downtime, and safety hazards for personnel, ultimately jeopardizing the reliability and profitability of oil operations.

To prevent or mitigate corrosion, corrosion inhibitors are often used. Current corrosion inhibitors, such as inorganic inhibitors, organic inhibitors, and volatile corrosion inhibitors, primarily focus on treating existing corrosion rather than modifying the environment to prevent corrosion altogether. While these inhibitors can provide temporary relief by forming protective layers on metal surfaces or altering the chemical reactions involved in corrosion, they often require frequent reapplication and may not offer long-term solutions. Additionally, many of current corrosion inhibitors may introduce environmental concerns due to their toxicity or persistence in the ecosystem.

Accordingly, there is a need for an improved corrosion-inhibiting agent(s) for in situ removal of oxygen within upstream oil systems. As will be described in greater detail below, the corrosion-inhibiting agent(s) provided herein create and maintain a corrosion-resistant environment by limiting or inhibiting the presence of oxygen within a wellbore during and after completion, and during production.

The information provided in this section is presented as background information and serves only to assist in any understanding of the present disclosure. No determination has been made and no assertion is made as to whether any of the above might be applicable as prior art with regard to the present disclosure.

Overview

Technology is disclosed herein for systems and techniques for inhibiting corrosion of metal infrastructures within an upstream oilfield system. In particular, corrosion-inhibiting agents are described herein for reducing dissolved oxygen levels within subterranean environments present within wellbores. As will be described in greater details below, the corrosion-inhibiting agents inhibit or prevent corrosion to the metal infrastructure of wellbores by reducing dissolved oxygen levels within fluids present in wellbores. Because the corrosion-inhibiting agents render dissolved oxygen inert, the anti-corrosive effects of the corrosion-inhibiting agents perpetuate throughout the upstream oilfield system, including the wellbore, storage systems, transport systems, and the equipment used to move fluid therebetween.

As will be expanded on below, the corrosion-inhibiting agents provide improved corrosion prevention over conventional techniques because they are tailored to suit the neutral to slightly acidic and sensitive environment of the upstream oilfield system. For example, the corrosion-inhibiting agents may be organic and may be sulfur-free. This reduces the reactivity of the corrosion-inhibiting agents with components in the oilfield fluids that may generate undesirable products, such as hydrogen sulfide. Additionally, by being organic and sulfur-free, the corrosion-inhibiting agents may be more environmentally friendly, thereby providing for more sustainable oil production practices. Additionally, the corrosion-inhibiting agents may have reduced pKa values which allow them to activate across a wide range of pHs that may be present within the wellbore. As those skilled in the art readily appreciate, maintaining a neutral pH within oilfield systems is not only vital to maintaining the quality of the hydrocarbon product but also the integrity of the reservoir and formations housing the hydrocarbons. As such, having corrosion-inhibiting agents that can activate within the neutral (to slightly acidic) pH environments of oilfield systems is vital to effectively preventing corrosion.

Overall, the corrosion-inhibiting agents provided herein reduce the concentration of dissolved oxygen within oilfield fluids by 99% within less than 30 minutes, especially in the presence of an activator. In fact, the corrosion-inhibiting agents can reduce the concentration of dissolved oxygen to less than 1 parts-per-million (ppm) or 50 parts-per-billion (ppb) in less than 30 minutes. As the presence of oxygen is a contributing factor for metal corrosion, reducing the concentration of oxygen within oilfield systems to near zero can inhibit or prevent oxygen-based corrosion to metal infrastructures.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

The accompanying drawings, which are incorporated into and constitute a part of this specification, illustrate one or more certain aspects and, together with the description of the example, serve to explain the principles and implementations of the certain examples.

FIG. 2 illustrates an example perspective illustrating fluid introduction into a wellbore, according to an embodiment herein;

FIG. 4 illustrates an example computing device suitable for providing a process of inhibiting corrosion of metal infrastructure, according to an embodiment herein;

FIG. 5 provides a picture of an experimental setup for Example 1;

Figure 1:
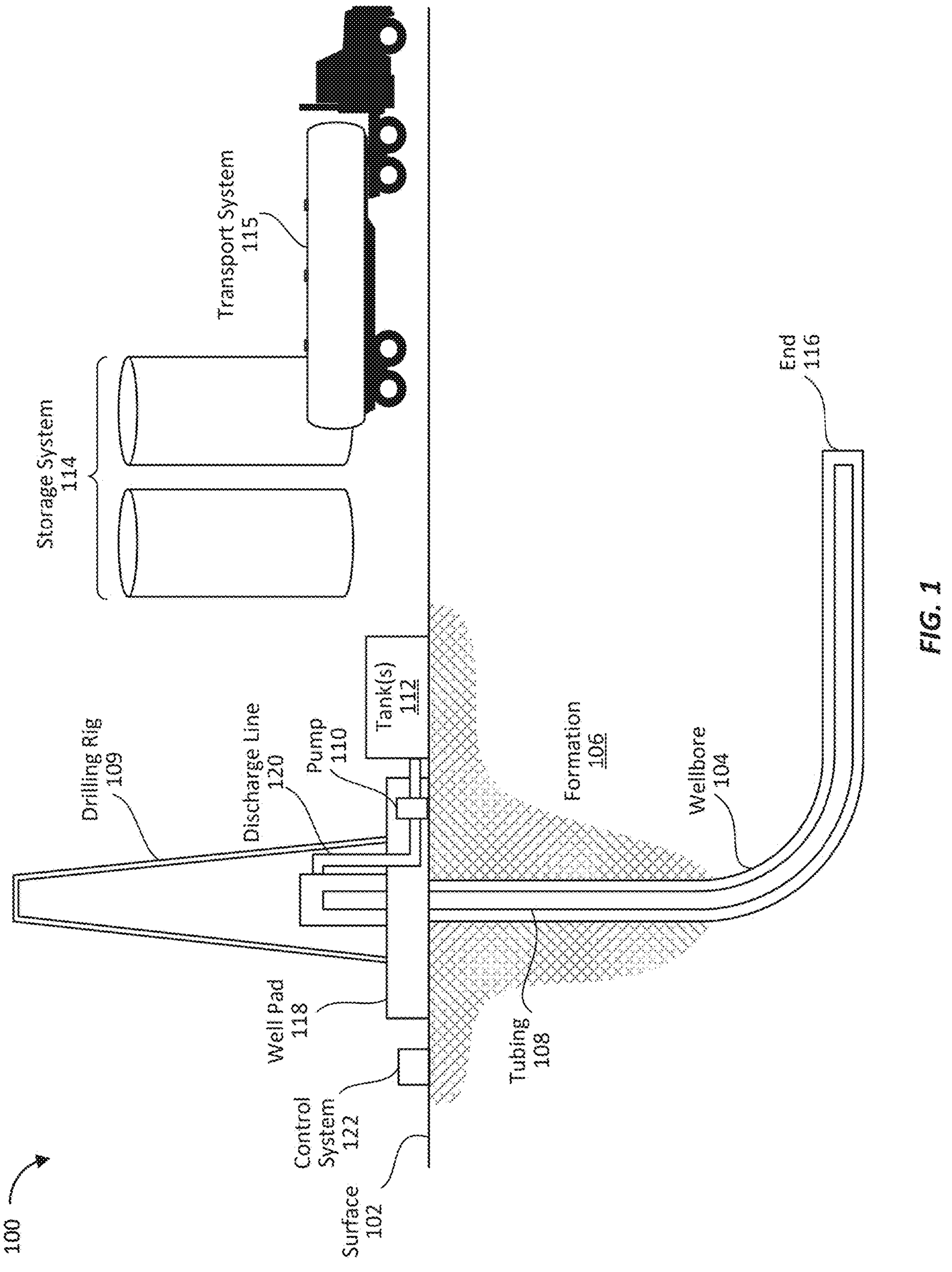
FIG. 1 illustrates an example upstream oilfield system, according to an embodiment herein.

Some components or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Corrosion stands as a pervasive and enduring challenge within the oil production industry, threatening the integrity of critical infrastructure and imposing significant financial and environmental burdens. While numerous factors contribute to corrosion in oil systems, the presence of oxygen emerges as a primary culprit. Oxygen, infiltrating oil systems through various avenues, initiates oxidative corrosion processes that compromise the structural integrity of metal components. Whether introduced during maintenance procedures or present in produced fluids, oxygen-induced corrosion manifests in various forms, including general corrosion, pitting corrosion, and stress corrosion cracking, posing serious risks to operational efficiency and safety.

Corrosion within oil systems, particularly when induced by the presence of oxygen, engenders a myriad of negative impacts that reverberate across operational and environmental domains. Oxygen-induced corrosion accelerates the degradation of metal infrastructure, leading to structural weakening, equipment failures, and leaks. Such outcomes not only incur substantial repair costs and production downtime but also pose safety hazards for personnel and nearby communities. Moreover, the release of corroded materials into the environment can result in soil and water contamination, exacerbating ecological damage and regulatory liabilities.

While oxygen corrosion has long plagued oilfield operations, the available solutions for mitigating this challenge remain limited. Currently, well owners and operators use corrosion inhibitors to address corrosion issues within oil systems. While conventional corrosion inhibitors may effectively alleviate corrosion-related issues, the conventional corrosion inhibitors fail to address the underlying causes of the corrosion. That is, conventional corrosion inhibitors merely treat the symptoms of corrosion rather than addressing the root cause, which often includes dissolved oxygen among other factors. In fact, in scenarios where dissolved oxygen concentrations are exceptionally high, relying solely on conventional corrosion inhibitors is known to be inadequate in fully curbing corrosion within oilfield systems. Thus, a more targeted approach to tackle the root cause, particularly in addressing dissolved oxygen levels, becomes imperative for comprehensive corrosion management.

Historically, conventional oxygen scavengers like ammonium bisulfite (ABS), sodium bisulfite (SBS), and sodium sulfite have been utilized in attempts to mitigate oxygen induced corrosion. However, these traditional methods have demonstrated inconsistent corrosion inhibition, particularly within the dynamic subterranean environments characteristic of oilfield systems. Notably, their efficacy is hindered by limited solubility in solvents other than water and diminished scavenging capabilities under fluctuating conditions such as pH, temperature, and salinity. Given the prevalent use of solvents like methanol or ethylene glycol in oilfield treatments and the diverse operating conditions inherent in wellbore completion and production activities, conventional oxygen scavengers often prove inadequate in providing the requisite corrosion prevention for upstream oil systems. For example, as will be described in greater detail below, conventional oxygen scavengers usually require a basic pH (>7.5) to activate, however, wellbores often have pHs that are below that value (see e.g., *Efficacy of Bisulfite Ions as an Oxygen Scavenger in Monoethylene Glycol* (*At Least* 20 *wt*%)/*Water Mixtures*. SPE J. 22 (2017): 1467-1477).

Moreover, these conventional oxygen scavengers, while intended to mitigate corrosion within upstream oilfield systems, may inadvertently react with components present in completion or production fluids, leading to undesirable consequences. For instance, in the presence of certain contaminants or chemical species commonly found in oilfield operations, these oxygen scavengers can undergo unwanted reactions, resulting in the formation of detrimental by-products. For example, SBS is known to react with naturally occurring sulfur compounds, which can produce hydrogen sulfide gas, a corrosive and toxic substance. Similarly, the interaction of these inorganic sulfur-containing oxygen scavengers with organic acids or aldehydes in production fluids may lead to the formation of fouling deposits or organic corrosion products, exacerbating corrosion-related issues rather than mitigating them. These unintended reactions underscore the limitations of conventional oxygen scavengers and emphasize the need for more tailored and compatible corrosion mitigation strategies within oilfield environments.

To address the above limitations of conventional corrosion inhibitors, systems and methods are provided herein to prevent or inhibit corrosion of metal infrastructures within upstream oilfield systems. In particular, corrosion-inhibiting agents are provided herein that reduce dissolved oxygen concentrations in upstream oilfield systems, such as in a wellbore during completion, after completion, and during production. The corrosion-inhibiting agents react with oxygen present within the upstream oilfield system such to render the oxygen inert, thereby reducing the concentration of reactive oxygen. Rendering oxygen inert can prevent corrosion of metal infrastructure by eliminating the reactive properties of oxygen, thereby inhibiting its ability to initiate oxidative corrosion processes on metal surfaces.

As can be appreciated, by reducing the levels of dissolved oxygen concentrations within a wellbore, the corrosion-inhibiting agents not only limit or prevent corrosion to wellbore infrastructure (e.g., production tubing, casing) but the corrosion-inhibiting agents also limit or prevent corrosion to components and equipment used for transport and storage of components produced from the well (e.g., crude oil, natural gas, produced water). Accordingly, the systems and techniques for providing the corrosion-inhibiting agents provided herein extend the life of not just the infrastructure of the wellbore, but also extend the functional life of infrastructure used for transport and storage of the well products.

Referring now to FIG. 1, an example upstream oilfield system 100 is provided, according to an embodiment herein. It should be appreciated that the system 100 is illustrated in a simplified form for ease of illustration. As such, various components may be simplified or excluded from the system 100.

In the vast and intricate world of oil exploration and production, upstream operations constitute the initial phase of the oil production process, where raw crude oil and natural gas are extracted from beneath the Earth's surface 102. At the heart of this complex system lies a wellbore 104, a meticulously engineered conduit that penetrates through layers of rock formations 106 deep below the surface 102. A drilling rig 109, positioned on a well pad 118, may support the wellbore 104 as it serves as the gateway to the subterranean reservoirs holding the coveted hydrocarbon resources. Surrounding the drilling rig 109 may be surface equipment and facilities, such as one or more pumps 110, tank(s) 112, storage systems 114, and transport systems 115, each playing a vital role in the extraction process.

As shown, the wellbore 104 extends through the formation 106 to reach the hydrocarbon reservoirs. Depending on the type of drilling and the type of formation 106, the wellbore 104 may extend both virtually and horizontally to a wellbore end 116. Upon completion, the wellbore 104 may include a tubing 108 through which fluids can be introduced into the wellbore 104. For example, during a fracturing process, fracturing fluid, also known as fracking fluid, may be injected into the wellbore 104 via the tubing 108 to extract resources trapped within the formation 106. Other fluids that may be introduced into the wellbore 104 may include fluids such as drilling fluids, completion fluids, or well-stimulating fluids. These fluids may be injected for various purposes, such as well stabilization, removal of residual fluids, such as remaining drilling fluids, acid fluids to remove formation damage, respectively.

To introduce fluids into the wellbore 104, the system 100 may include the pump 110 and one or more tank(s) 112. The tanks 112 may house the fluid that is to be introduced into the well. The pump 110 may pump the fluid from the tanks 112 via a discharge line 120 and into the tubing 108. A control system 122 may control the introduction of the fluids via the pump 110. For example, the control system 122 may regulate the injection rate and volume of fluids being injected, as well as monitor and regulate fluid flow from the reservice to the surface 102. Additionally, the control system 122 may ensure safety through mechanisms such as blowout preventers and emergency shutdown valves, facilitate well testing operations, and provide remote operation and monitoring capabilities for efficient well management. By collecting and analyzing data from sensors and instruments throughout the system 100, the control system 122 enables operators to optimize production, diagnose issues, and ensure regulatory compliance.

Referring now to FIG. 2, a perspective 200 is provided illustrating fluid 224 introduction into a wellbore 204, according to an embodiment herein. As shown, a fluid 224 is injected into the wellbore 204, which may be the same or similar to the wellbore 104. The fluid 224 may be injected or introduced into the wellbore 204 via a pump, such as the pump 110. In the illustrated example, the fluid 224 is injected via tubing 208, which may be the same or similar to the tubing 108, however, it should be appreciated that in other cases the fluid 224 may be injected via other means, such as via an annulus 226.

It should be appreciated that while FIG. 2 illustrates the fluid 224, which may be in a liquid or gas state, into the wellbore 204, in other scenarios, the fluid 224 may be flowing out of the wellbore 204 via the tubing 208. For example, during production, hydrocarbons from the formation 206 may flow out of the wellbore 204 via the tubing 208 as the fluid 224. Depending on the application or process, the flow of the fluid 224 may vary.

As shown, the wellbore 204 may include a casing 228. During well completion, the casing 228 is inserted into the wellbore 204 and cemented in place to provide structural integrity and isolate the wellbore 204 from surrounding formations 206. Subsequently, the tubing 208 is introduced into the casing 228, creating an annular space (e.g., the annulus 226) between the casing 228 and the tubing 208. As the fluid 224 is introduced into the well through the tubing 208, where it travels downhole to perform various functions such as well stimulation or production enhancement, the 224 fluid is cycled back to the surface (e.g., the surface 102) through the annulus 226. As such, the annulus facilitates the removal of cuttings, maintenance of pressure control, and extraction of produced fluids 230 for further processing. As those skilled in the art readily appreciate, the produced fluids 230 depends on the type of fluid 224 being introduced into the well and the application. In various examples, the produced fluids 230 may be or include formation fluids, contaminants, and water.

As described above, various components of the well infrastructure are typically constructed from metal due to the material's durability, and strength, and corrosion resistance, all essential qualities for withstanding the harsh conditions encountered in oil and gas operations. The well infrastructure includes components such as the casing 228, the tubing 208, and downhole equipment (e.g., the storage systems 114 and the transport systems 115) are commonly made from or include steel alloys engineered to withstand high pressures, temperatures, and corrosive environments encountered deep underground. Additionally, the wellhead, valves, and other surface equipment are often fabricated from metal to ensure reliable operation and long-term performance in challenging environments. Whether it's the casing 228 protecting the wellbore 204, the tubing 208 conveying fluids 230 to the surface 102, or the sturdy wellhead supporting surface operations, metal components form the backbone of well infrastructure, ensuring the safe and efficient extraction of oil and gas resources from subsurface formations.

Due to the metal infrastructure of upstream oilfield systems, such as the system 100, corrosion is a prevalent concern. As those skilled in the art readily appreciate, corrosion poses a significant challenge to the metal infrastructure of both the wellbore 204 (or 104) and surface equipment in oil and gas operations. Corrosion may occur due to a variety of factors, such as the corrosive and acidic conditions of the subterranean environment of the wellbore 204. One prevalent cause of corrosion is the presence of oxygen. Oxygen-induced corrosion, often referred to as aerobic corrosion, occurs when oxygen comes into contact with metal surfaces in the presence of moisture or electrolytes. This interaction initiates electrochemical reactions, leading to the formation of metal oxides or hydroxides on the surface of the metal. In the context of oilfield systems, such as the system 100, oxygen can infiltrate through various pathways, including leaks in seals or through the introduction of oxygen-containing fluids during operations. Once oxygen reaches the metal surfaces, it accelerates corrosion processes, particularly in the presence of other corrosive agents like hydrogen sulfide or carbon dioxide, which are often found in oil and gas reservoirs.

As noted above, oxygen is commonly introduced into the system 100 when fluids, such as the fluid 224 are injected into the wellbore 204. Common fluids that introduce oxygen into the wellbore 204 are fluids used during the fracturing process, referred to as 'fracking fluids.' For example, fracking fluids, which are primarily composed of water and various additives, are injected into the wellbore 204 under high pressure to fracture the rock formations 202 and release trapped natural gas or oil. During this process, the high-pressure injection introduces air or oxygen from the atmosphere into the wellbore 204. While the introduction of oxygen into the wellbore 204 can aid in the oxidation of organic matter within the reservoir, aiding in the breakdown of hydrocarbons and enhancing production yields, the introduction of oxygen exposes the metal infrastructure to an increased risk of corrosion.

As can be appreciated, as oxygen levels rise within the fluid 224, the likelihood of corrosion escalates. Oxygen serves as an oxidizing agent, initiating and accelerating corrosion reactions with metallic components of the system. This phenomenon is particularly pronounced in environments where metal surfaces are exposed to water and hydrocarbons, creating conditions ripe for electrochemical corrosion processes. Therefore, in oilfield operations, controlling oxygen levels in fluids becomes imperative to mitigate corrosion-related risks, ensuring the longevity and reliability of equipment and infrastructure.

While oxygen corrosion is a well-known issue for oilfield operations, there are limited solutions for addressing this challenge. Commonly, well owners and operators apply corrosion inhibitors which are directed to protecting the metal infrastructure. These conventional corrosion inhibitors, however, fail to address the root cause of the corrosion. In other words, conventional corrosion inhibitors treat the metal infrastructure without addressing the environment that is causing corrosion to the metal infrastructure (e.g., dissolved oxygen). As such, the corrosive environment (e.g., dissolved oxygen) continues through the system 100 as the fluid 224 progresses, exposing respective infrastructure to corrosion. Moreover, in cases where dissolved oxygen concentration within the fluid 224 is extremely high, application of corrosion inhibitors alone may be insufficient to fully mitigate corrosion within the system 100.

Corrosion-Inhibiting Agents

To address oxygen-based corrosion, corrosion-inhibiting agents are provided herein. In particular, the corrosion-inhibiting agents herein inhibit or prevent corrosion to the metal infrastructure of upstream oilfield systems, such as the system 100, by reducing the oxygen concentration within the wellbore, such as the wellbore 204. The corrosion-inhibiting agents act as oxygen scavengers to neutralize oxygen, thereby making any oxygen present in the fluid 224 inert. Once inert, the oxygen has limited to no reactivity with the metal infrastructure. As such, the corrosion-inhibiting agents provided herein drastically reduce the corrosion rate due to the presence of oxygen within oilfield systems, such as the system 100.

Not only do the corrosion-inhibiting agents reduce the rate of corrosion with respect to the component into which the agent is introduced, but the corrosion inhibiting agents also inhibit or limit corrosion for any downstream components that the fluid 224 comes in contact with. That is, since the corrosion-inhibiting agents remove the dissolved oxygen from the fluid 224, as the produced fluid 230 progresses through the system 100, such as being stored in the storage system 214 or transported via the transport system 215, the reduced rate of corrosion carries forward. This is in contrast to conventional corrosion inhibitors which often are applied to various components throughout the system 100 to prevent corrosion only for each respective component.

The corrosion-inhibiting agents provided herein may include one or more ascorbic acid or a salt thereof, erythorbic acid or a salt thereof, carbohydrazide, diethylhydroxylamine (DEHA), methylethylketoxime (MEKO), hydroquinone (HQ), or hydrazine. As will be described in detail below, a respective corrosion-inhibiting agent may be selected based on a variety of factors, such as the application, the fluid 224 into which the corrosion-inhibiting agent is being introduced, and where in the well-life cycle the corrosion-inhibiting agent is being introduced. In general, however, the corrosion-inhibiting agent may be an organic compound that is free from sulfur. Table 1 provided below illustrates the properties of various corrosion-inhibiting agents provided herein. As shown, in some cases, the corrosion-inhibiting agent may have a low pKa suitable for activating within the neutral environment of the wellbore 204.

TABLE 1

| Corrosion-Inhibiting Agent | Organic VS Inorganic | ~pKa | Contains Sulfur? | Solubility in Water | Solubility in Other Solvents | Molecular Weight (g/mol) |
|---|---|---|---|---|---|---|
| Ascorbic Acid | Organic | 4.17 | No | 330 g/L | Methanol, ethanol, glycerol, propylene glycol | 176.12 |
| Carbohydrazide | Organic | 11.81 | No | Very | ethanol | 90.09 |
| Diethylhydroxylamine (DEHA) | Organic | 5.7 | No | Miscible | — | 89.14 |
| Methylethylketoxime (MEKO) | Organic | 12.45 | No | Miscible | Ethanol | 87.12 |

TABLE 1-continued

| Corrosion-Inhibiting Agent | Organic VS Inorganic | ~pKa | Contains Sulfur? | Solubility in Water | Solubility in Other Solvents | Molecular Weight (g/mol) |
|---|---|---|---|---|---|---|
| Hydroquinone (HQ) | Organic | 9.9 | No | 59 g/L | Ethanol, acetone | 110.11 |
| Erythorbic Acid | Semi-inorganic | 4.1 | No | Very | Methanol, ethanol, glycerol, propylene glycol | 176.12 |
| Hydrazine | Inorganic | 8-9 | No | Miscible | Ethanol, methanol | 32.05 |
| Sodium Sulfite | Inorganic | ~9 | Yes | 300.7 g/L | -Ethanol | 126.04 |
| Sodium Bisulfite | Inorganic | ~7 | Yes | 420 g/L | — | 104.06 |
| Ammonium bisulfite | Inorganic | 7 | Yes | 718 g/L | — | 99.11 |
| Sodium Metabisulfite | Inorganic | ~1.8 | Yes | 653 g/L | Glycerol, ethanol | 190.11 |
| Sodium Thiosulfate | Inorganic | 1.74 | Yes | 764 g/L | — | 112.12 |

As noted above, a corrosion-inhibiting agent may be selected based on the application. Generally, within upstream oilfield systems, such as the system 100, a corrosion-inhibiting agent is organic. Solvents, such as methanol or ethylene glycol, are commonly used in upstream oilfield systems, such as the system 100. As such, it is necessary that the corrosion-inhibiting agent is soluble in a respective solvent that is being used. The organic nature of the corrosion-inhibiting agent may allow it to be more soluble in organic solvents or water compared to inorganic compounds, such as conventional oxygen scavengers. The increased solubility of the corrosion-inhibiting agent enhances its ability to interact with oxygen molecules, especially within the fluid 224.

The corrosion-inhibiting agents provided herein have improved oxygen scavenging properties within the subterranean environment of the wellbore 204 at least due to their intricate molecular structures and versatile chemical properties. One key advantage lies in the corrosion-inhibiting agent's ability to undergo diverse reactions, facilitating the efficient removal of oxygen from various environments. For instance, the organic nature of the corrosion-inhibiting agents can engage in redox reactions, where they readily donate electrons to oxygen molecules, converting both the oxygen and the corrosion-inhibiting agent into harmless byproducts. This electron transfer capability is pivotal in neutralizing oxygen's corrosive effects, especially in the sensitive environment of the wellbore 204. As will be described in greater detail below, in some applications, it is imperative to maintain a neutral pH within the wellbore 204 to prevent damage to the reservoir or the formation 206.

Depending on the application, the corrosion-inhibiting agent may possess one or more functional groups such as hydroxyl (—OH), carbonyl (C═O), and amino (—NH2), which enhance their oxygen-scavenging capabilities. These functional groups exhibit affinity towards oxygen, forming stable complexes that effectively sequester it from the surrounding environment. Additionally, the presence of multiple reactive sites within organic molecules of the corrosion-inhibiting agent, enabling them to scavenge oxygen in a controlled and targeted manner, minimizing unwanted side reactions and preserving the integrity of the system.

Furthermore, the corrosion-inhibiting agents provide for minimal environmental impacts and allow for more sustainable practices over conventional oxygen scavengers. For example, the corrosion-inhibiting agents may be partially or completely biodegradability, making them environmentally friendly. Unlike conventional oxygen scavengers which are primarily composed of inorganic compounds which often persist in the environment as non-biodegradable pollutants, the corrosion-inhibiting agents can undergo natural decomposition processes, reducing their ecological footprint over time. Since the corrosion-inhibiting agents are injected into the subterranean environment, they are likely to come in contact with the formation 206. As those skilled in the art readily appreciate, the formation 206 may have a porosity or cracks such that fluids 224 injected into the wellbore 204 may travel into and through the formation 206, in some cases to underwater aquafers. As such, minimizing the environmental impacts of the corrosion-inhibiting agents is a key concern when working in the upstream oilfield system 100.

The corrosion-inhibiting agents provided herein are tailored to be effective at pH values relevant to conditions within the wellbore 204 or subterranean environment of the upstream oilfield system 100 (usually neutral or slightly acidic). As those skilled in the art readily appreciate, maintaining a neutral pH within the wellbore 204 is crucial for a variety of reasons. For example, a neutral pH aids in preserving the integrity of the well structure within the formation 206, as well as the metal infrastructure of the wellbore 204. Acidic or alkaline conditions can accelerate corrosion processes, leading to degradation of the metal infrastructure.

Additionally, maintaining a neutral pH promotes optimal reservoir conditions for petrochemical recovery. Extremes in pH can alter the permeability of the formation, reducing the flow of oil and water and impeding production rates. By keeping the pH neutral, operators can ensure the reservoir's porosity and permeability remain intact, facilitating efficient oil extraction. Moreover, maintaining a neutral pH is essential for safeguarding environmental health. Drastic shifts in pH can adversely impact groundwater quality and aquatic ecosystems within the formation 206, leading to contamination and habitat destruction. Therefore, by adhering to neutral pH levels, environmental risks can be mitigated, and responsible stewardship of natural resources upheld. Overall, maintaining a neutral pH within the wellbore 204 and its respective subterranean environments is imperative for sustaining safe, efficient, and environmentally responsible oil production practices.

To activate effectively within the neutral to slightly acidic pH environment of the wellbore 204, the corrosion-inhibiting agents may have low pKa values (acid dissociation constants). For example, the corrosion-inhibiting agents provided herein may have pKa values ranging from 2 to 8, from 3 to 7, from 4 to 6, from 4 to 5, and in exemplary cases, from 4 to 4.5. In contrast, conventional oxygen scavengers, such as sodium sulfite and sodium bisulfite, may have higher pKa values (~9 and ~7 respectively). The higher pKa value of conventional oxygen scavengers may be incompatible with the upstream oilfield system 100, at least due to the inability of the scavenger to activate within the neutral to slightly acidic pH environment of the wellbore 204. That is, conventional scavengers usually require a basic environment (e.g., a pH greater than 7, often closer to 8 or 9) to activate and achieve meaningful reaction rates. Thus, in the neutral environment of the wellbore 204 the conventional oxygen scavengers may not function appropriately or even activate, thereby providing inadequate oxygen scavenging.

By having low pKa values, the corrosion-inhibiting agents readily activate in the neutral pH environment of the wellbore 204. For example, the corrosion-inhibiting agent may activate at any pH at or around 4.5. As those skilled in the art readily appreciate, by having low pKa values, the corrosion-inhibiting agents readily donate protons, effectively neutralizing any excess base present in the environment, thereby stabilizing the pH. This equilibrium shift towards proton donation ensures that the wellbore 204 remains conducive for various chemical processes, such as oxygen scavenging, without tipping towards acidity or alkalinity.

The proton-donating ability of the corrosion-inhibiting agents can also aid in their ability to participate in the redox reactions crucial for oxygen scavenging. During oxygen scavenging, the corrosion-inhibiting agents having low pKa values are able to serve as potent reducing agents, readily reacting with oxygen molecules present in the fluid 224. The proton-donating nature of the corrosion-inhibiting agents facilitates electron transfer, effectively reducing the oxygen to a harmless byproduct. The low pKa values of the corrosion-inhibiting agents not only eliminates oxygen within the fluids 224 and 230, thereby lowering the oxygen concentration and preventing oxidation-related corrosion, but low pKa values also help maintain the chemical stability and integrity of the wellbore 204 environment. Consequently, the corrosion-inhibiting agents having low pKa values are versatile components that can readily activate in neutral pH environments, provide pH regulation, and perform oxygen scavenging.

In some embodiments, the corrosion-inhibiting agents may be or include sulfur-free components, such as ascorbic acid, carbohydrazide, MEKO, or HQ. Depending on the application, it may be desirable to have sulfur-free components due to the reactivity of sulfur and environmental or production concerns of introducing additional sulfur into the wellbore 204. As those skilled in the art may readily appreciate, adding components containing sulfur to the wellbore 204, prior to or during petrochemical extraction, can pose significant risks to the overall process. Not only can the presence of sulfur catalyze corrosive reactions, leading to premature degradation and potential failure of the well infrastructure, but sulfur-containing compounds pose safety hazards for personnel and environmental risks if leaks or failures occur.

Additionally, sulfur compounds introduced into the wellbore 204 can contaminate the produced fluid 224, such as the petrochemical product affecting its quality and market value. For example, sulfur-rich crude oil requires additional processing to remove sulfur contaminants, which increases production costs and complexity. Moreover, sulfur emissions during oil production and processing contribute to environmental pollution and pose health risks to nearby communities. Accordingly, sulfur-free property of the corrosion-inhibiting facilitates operational integrity, safety, and environmental stewardship of the wellbore 204 and the overall upstream oilfield system 100.

In some embodiments, the corrosion-inhibiting agents provided herein may include or function as a singlet oxygen scavenging molecule (hereinafter "singlet scavenging molecule"). For example, a corrosion-inhibiting agent may contain ascorbic acid, which can act as a singlet scavenging molecule. Ascorbic acid possesses antioxidant properties and has been shown to effectively quench singlet oxygen by donating electrons to neutralize its reactivity. While single oxygen, a high-energy form of molecular oxygen with two unpaired electrons in the same spin state, may not be commonly found in the wellbore 204, it may be present in the wellbore 204 as a result of various chemical reactions occurring during petrochemical extraction or production processes.

In some embodiments, the corrosion-inhibiting agents may require activation. As such, in various applications, an activator may be introduced into the wellbore 204 along with a corrosion-inhibiting agent. The addition of an activator, such as a catalyst, may be made for a variety of reasons, such as to accelerate the oxygen scavenging process (e.g., increase reaction rate) or achieve near complete (e.g., 99%) reduction in dissolved oxygen present in the fluid 224. For example, the reaction between the singlet scavenger molecules of the ascorbic acid and the triplet molecular oxygen is spin-forbidden, resulting in a pronounced kinetic barrier. By adding an activator, such as a copper catalyst (e.g., $CuSO_4 \cdot 5H_2O$), the kinetic barrier can be overcome, and the ascorbic acid can react with the triplet molecular oxygen.

The activator may vary depending on the application, and in some cases, based on a selected corrosion-inhibiting agent. Example activators may include copper(II) chloride, copper(II) sulfate, iron(II) chloride, iron(III) chloride, iron (II) sulfate, iron(III) sulfate, nickel(II) chloride, nickel(II) sulfate, cobalt(II) chloride, cobalt(II) sulfate, or activated carbon.

In some embodiments, the corrosion-inhibiting agent may activate in situ within the wellbore 204. That is, the corrosion-inhibiting agents may use components present in the fluid 224 for activation. For example, water produced from the wellbore 204, such as the produced fluid 224, may contain a wide range of inorganic cations and anions (see e.g., *Review of technologies for oil and gas produced water treatment*, Journal of Hazardous Materials, Volume 170, Issues 2-3, 2009, Pages 530-551). While these produced fluids 230 are undesirable, they are an unavoidable aspect of the upstream oilfield system 100. As such, the corrosion-inhibiting agent may leverage the catalytically active species present in these produced fluids 230 to activate in situ.

The metal infrastructure of the wellbore 204 may also provide for in situ activation of the corrosion-inhibiting agents. For example, iron is a known catalyst and as such, the steel metallurgy of the tubing 208 and/or the casing 228, may activate the corrosion-inhibiting agents in situ. In cases where the corrosion-inhibiting agents are able to activate in situ, no additional activator may be required to achieve a desirable or suitable reduction of dissolved oxygen concentration.

Figure 3:
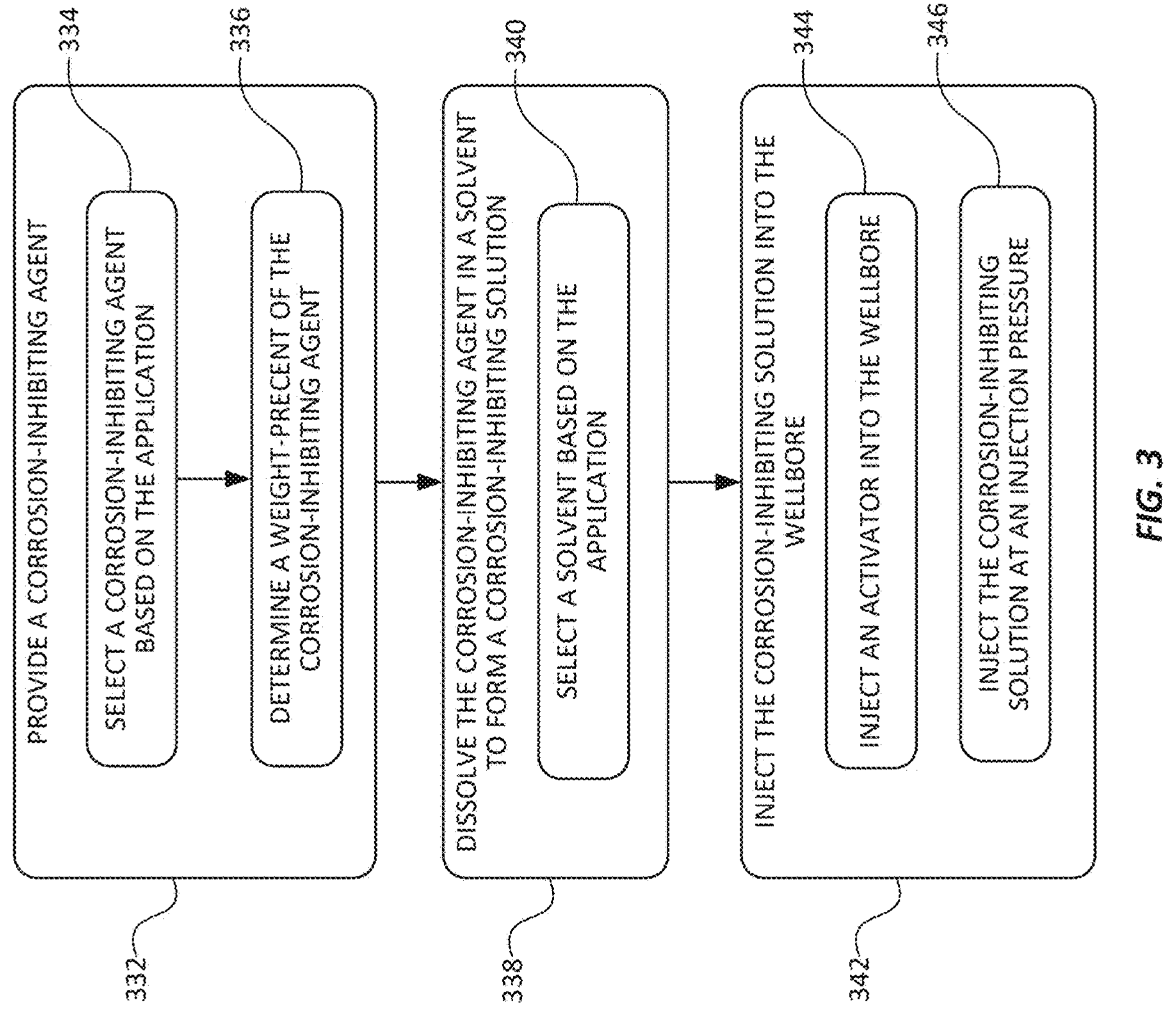
FIG. 3 illustrates an example process for inhibiting corrosion of metal infrastructure within a wellbore, according to an embodiment herein.

Referring now to FIG. 3, an example process 300 for inhibiting corrosion of metal infrastructure within a wellbore is provided, according to an embodiment herein. In particular, the process 300 illustrates an example method for inhibiting corrosion using a corrosion-inhibiting agent, as provided herein. It should be appreciated, that while FIG. 3 is described with respect to FIGS. 1-2, the process 300 is not meant to be limited to the systems or components of FIGS. 1 and 2.

As shown, the process 300 includes providing a corrosion-inhibiting agent (332). The corrosion-inhibiting agent may be or include ascorbic acid or a salt thereof, erythorbic acid or a salt thereof, DEHA, carbohydrazide, hydrazine, HQ, MEKO, sulfite, bisulfite, metabisulfite, or combinations thereof. The step 332 for providing a corrosion-inhibiting agent may include selecting one or more corrosion-inhibiting agents (334). The selection of a respective corrosion-inhibiting agent may be based on one or more wellbore factors. Wellbore factors may include the application into which the agent is being introduced or the solvent being used for the introduction, the type and size of the wellbore 204, downstream processing requirements, and the like. Additional wellbore factors may include a temperature in the wellbore, a pH of the wellbore, a composition of the wellbore fluid (e.g., salinity, chemical makeup, reactivity). Since the process 300 may be performed anywhere along the well-life timeline, the corrosion-inhibiting agent may be introduced into a wide-range of applications or during a variety of processes. For example, the process 300 may be performed prior to, during, or after a fracture process, a completion process, or production process.

In some embodiments, the selection of a corrosion-inhibiting agent may be made based on the agent's solubility in an application's solvent or a selected solvent for the injection process, as will be described in greater detail below. For example, if the application involves a fracturing process, thus there is an increased concentration of water, or the solvent is water-based, then the corrosion-inhibiting agent may be DEHA, ascorbic acid, or carbohydrazide.

In some cases, the corrosion-inhibiting agent may be selected based on the application and the characteristics thereof. For example, if the application involves completion fluids, such as brines or packer fluids, then a corrosion-inhibiting agent having a lower pKa value, such as ascorbic acid, may be selected due to its ability to activate within the neutral to slightly acidic pH of the completion fluids. As can be appreciated, the composition of the fluid 224 being introduced into the wellbore 204, as well as the chemical composition of the extracted fluids from the formation 206, may impact the reactivity, viability, and/or effectiveness of the corrosion-inhibiting agent. As such, the corrosion-inhibiting agent may be selected based on the application and any components or characteristics associated with the application.

In some cases, as part of providing the corrosion-inhibiting agent, a weight-percentage of the corrosion-inhibiting agent may be determined (336). The weight-percentage of the corrosion-inhibiting agent may be determined based on one or more wellbore factors, such as the overall volume of fluid 224 into which the corrosion-inhibiting agent is introduced into. As noted above, other wellbore factors may include the geometry of the wellbore 204, the type of fluid or application into which the corrosion-inhibiting agent is being introduced. Other wellbore factors may include a wellbore temperature, pressure, geographical location, which may impact the subterranean environment conditions or restrictions applicable to the wellbore 204, and the like.

In some embodiments, the weight-percentage of the corrosion-inhibiting agent may be determined based on the volume of the solvent into which the agent is mixed, as will be described below. Depending on the application, the corrosion-inhibiting agent may have a weight-percentage ranging from 0.00005% to 0.0005% by weight, from 0.0001% to 0.0004% by weight, from 0.0001% to 0.0003% by weight, or from 0.0001% to 0.0002% by weight. In some cases, the weight-percentage of the corrosion-inhibiting agent may be determined based on a resulting parts-per-million (ppm) concentration of a corrosion-inhibiting solution formed by dissolving the corrosion-inhibiting agent in a solvent. For example, the weight-percentage of the corrosion-inhibiting agent may be determined such that the corrosion-inhibiting agent has a concentration of 50 ppm, 100 ppm, 150 ppm, 200 ppm, 250 ppm, 300 ppm, 400 ppm, or 500 ppm or any range therebetween when dissolved to form the corrosion-inhibiting solution.

In some embodiments, the amount of corrosion-inhibiting agent may be determined based on an amount of dissolved oxygen present in the wellbore 204. In such cases, the process 300 may include measuring or otherwise determining a dissolved oxygen concentration in the fluid 224 within the wellbore. Sensors, such as optical sensors or electrochemical sensors may be used to measure dissolved oxygen concentrations in the fluid 224 in real time. In other cases, the fluid 224 may be sampled and the dissolved oxygen concentration may be determined in a laboratory setting.

In some embodiments, instead of or in addition to measuring the dissolved oxygen concentration in the fluid 224, indirect measuring techniques may be used. For example, iron and/or manganese concentrations in the fluid 224 may be measured and used as indicators of oxygen levels within the fluid 224. When dissolved oxygen is present, it can react with iron and manganese ions present in the formation or metal infrastructure, leading to their oxidation from a soluble state to insoluble forms. Consequently, monitoring the concentrations of iron and manganese in the fluid 224 can provide valuable insights into the presence and extent of dissolved oxygen. Analytical techniques such as colorimetry, spectrophotometry, or inductively coupled plasma (ICP) spectroscopy may be employed to quantify the concentrations of iron and manganese ions in the fluids 224, allowing for the estimation of dissolved oxygen concentrations indirectly.

Based on the dissolved oxygen concentration, the amount of corrosion-inhibiting agent may be determined. In an example, the amount of corrosion-inhibiting agent may be determined stoichiometrically. Since the corrosion-inhibiting agent functions, in part, by reacting with the dissolved oxygen, by determining a stoichiometric amount of the corrosion-inhibiting agent, a desired level of protection against corrosion can be achieved by ensuring that the dissolved oxygen is fully consumed. In some embodiments, a molar ratio between the corrosion-inhibiting agent and the dissolved oxygen may be 10:1, 8:1, 4:1, 2:1, or in a preferred embodiment, 6:1, depending on the application and the selected corrosion-inhibiting agent. As can be appreciated, this stoichiometric approach may allow for precise control over the dosage of the corrosion-inhibiting agent, ensuring effective corrosion protection while minimizing the introduction of excessive corrosion-inhibiting agent into the wellbore 204 and associated costs.

As noted above, the corrosion-inhibiting agent, once selected, may be dissolved into a solvent to form a corrosion-inhibiting agent (338). In some cases, prior to dissolving the corrosion-inhibiting agent into the solvent, the solvent may be selected (340). The solvent may be selected based on the application. For example, the solvent may be selected to be compatible with the process fluids being injected into the wellbore 204, such as the fluid 224. In some embodiments, the solvent may be a water-miscible solvent, such as methanol, ethylene glycol, water, isopropanol, EGMBE (Ethylene Glycol Monobutyl Ether), diethylene glycol, or diglyme. Other solvents may be or include brines, packer fluids, completion washes, fracturing fluids (water-based, oil-based, or foam-based), surfactants, polymers, alkaline agents, or various biocides.

In some embodiments, a volume of the solvent may be determined based on the amount of corrosion-inhibiting agent being introduced into the wellbore 204. In other words, the volume of solvent may be dependent on the amount of corrosion-inhibiting agent and the solubility of the corrosion-inhibiting agent in the solvent. As such, the volume of the solvent may be the amount of solvent required to fully dissolve the corrosion-inhibiting agent and form a solution.

In some embodiments, one or more additional components may be added to the solution. For example, one or more additional corrosion inhibitors may be added to the solution to provide additional corrosion prevention. As can be appreciated, while the corrosion-inhibiting agent addresses the source of the corrosion (e.g., the dissolved oxygen), these additional corrosion inhibitors may add to the overall corrosion prevention approach by forming protective films over or passivating the metal surfaces. Examples of additional corrosion inhibitors that may be added include one or more film-forming corrosion inhibitors (FFCIs). Example FFCIs include phosphate esters, polycarboxylates, quaternary ammonium surfactants, zwitterionic surfactants, amidoamines, imidazolines, amides, ethoxylated amines/amides, mercaptocarboxylic acids, sulfur-containing heterocycles, sulfur/nitrogen-containing heterocycles, polyamino acids, and the like.

Once the corrosion-inhibiting agent is dissolved in the solvent to for the corrosion-inhibiting solution, the corrosion-inhibiting solution may be injected into the wellbore 204 (342). The corrosion-inhibiting solution may be injected into the wellbore 204 using the pump 110. In some cases, the corrosion-inhibiting solution may be introduced into the tank 112. In other embodiments, the corrosion-inhibiting agent may be introduced directly into fluids, such as the fluid 224, that are held in the tanks 112. In other embodiments, the corrosion-inhibiting solution may be injected into the discharge line 120, or any other line that accesses the wellbore 104.

As those skilled in the art readily appreciate, fluids can be injected into the wellbore 204 through two primary methods: via the tubing 208 or into the annulus 226. Selection of injection method generally depends on the specific objectives of the operation and the well configuration. For instance, during primary and secondary production phases, fluids 224 such as production chemicals and scale inhibitors are commonly injected into the 208 tubing to treat the reservoir or enhance production efficiency. This approach allows direct access to the wellbore 204 and reservoir, facilitating targeted treatment and control over fluid placement. On the other hand, during well workover operations or secondary recovery techniques like hydraulic fracturing or water flooding, fluids 224 may be injected into the annulus 226. This method enables the creation of hydraulic fractures, injection of stimulation fluids, or establishment of secondary recovery mechanisms without compromising the integrity of the tubing 208. By leveraging the annulus 226, operators can efficiently deliver fluids 224 to specific zones of interest within the reservoir, optimizing production rates and ultimate recovery. Thus, the selection between tubing and annular injection methods depends on the desired treatment objectives, well conditions, and operational considerations. In other words, the corrosion-inhibiting solution may be injected into the tubing 208 or into the annulus 226, depending on the application and treatment targets.

The corrosion-inhibiting solution may be injected into the wellbore 204 at an injection temperature and an injection pressure. The injection temperature may be a well environment or ambient temperature. In some cases, the corrosion-inhibiting solution may be heated prior to injection into the wellbore 204, such as to or above 100° F. In example embodiments, the injection temperature may be in the range from 65° F. to 150° F., from 70° F. to 135° F., from 72° F. to 135° F., from 72° F. to 100° F., or from 100° F. to 135° F. The injection temperature may be selected depending on the application or to enhance activation of the corrosion-inhibiting agent.

As noted above, the corrosion-inhibiting solution may be injected into the wellbore 204 at an injection pressure. The injection pressure may be at or above the wellbore pressure, depending on the application. The injection pressure may range from a few hundred to several thousand pounds per square inch (psi), with specific values determined by factors such as reservoir characteristics, fluid properties, and operational objectives. For instance, in water injection for secondary recovery, injection pressures are often maintained slightly above the reservoir pressure to create a driving force that pushes injected fluids into the formation, displacing oil and facilitating its recovery. Similarly, during well stimulation treatments like hydraulic fracturing, injection pressures are significantly higher than the reservoir pressure to induce fractures in the formation and prop open the resulting fissures, enhancing permeability and increasing hydrocarbon flow rates. As those skilled in the art readily appreciate, controlling the injection pressure allows operators to manipulate reservoir conditions, optimize production rates, and maximize ultimate recovery from the wellbore 204. Thus, the injection pressures play a critical role in determining the effectiveness and success of various well operations, including application and activation of the corrosion-inhibiting agent.

In some embodiments, an activator may be injected in the wellbore 204 along with the corrosion-inhibiting solution (344). As described above, the activator may be or include copper(II) chloride, copper(II) sulfate, iron(II) chloride, iron(III) chloride, iron(II) sulfate, iron(III) sulfate, nickel(II) chloride, nickel(II) sulfate, cobalt(II) chloride, cobalt(II) sulfate, or an activated carbon, depending on the application and the selected corrosion-inhibiting agent. Once the activator is selected, an amount of activator may be determined. In example embodiments, an amount of activator may be 2%, 5%, or 10% of the corrosion-inhibiting agent, depending on the reaction kinetics. That is, the activator may be added at a ratio of 1:50, 1:20, 1:10, or 1:5 to the corrosion-inhibiting agent. In an example, embodiment, the activator may be added to achieve a 5 ppm, 10 ppm, 15 ppm, or 20 ppm concentration in the corrosion-inhibiting solution.

The activator may be added to the wellbore 204 at the same time that the corrosion-inhibiting solution is injected or the activator may be time-delayed injected from the corrosion-inhibiting solution. In the first scenario, the activator may be added to the corrosion-inhibiting solution and then injected into the wellbore 204 or the activator may be separately injected into the wellbore 204 in parallel to the corrosion-inhibiting solution injection. Since the activator activates the corrosion-inhibiting agent, it may be desirable to inject the activator on a time-delay to prevent activation and consumption of the corrosion-inhibiting agent before the corrosion-inhibiting solution reaches treatment targets, such as the end 116 of the wellbore 104.

In the second scenario, the activator may be time-delayed injected into the wellbore 204. The time-delay injection may result in the activator being injected into the wellbore 204 at a time after the injection of the corrosion-inhibiting solution. The time-delay between the first time at which the corrosion-inhibiting solution is injected and the second time at which the activator is injected into the wellbore 204 may be an injection timeframe. As can be appreciated, the injection timeframe may vary depending on the wellbore 204 configuration, fluid flowrate, application, and characteristics (e.g., formation 106 porosity). For example, if the wellbore 204 is a large wellbore, thus having an extensive length from the pump 110 to the end 116, then the injection timeframe may be larger than for scenarios in which the wellbore 204 is a small wellbore, having a reduced length between the pump 110 and the end 116. The injection timeframe may be determined based on when it is desirable to activate the corrosion-inhibiting solution (e.g., at the end 116 or throughout the tubing 108).

In some embodiments, a control system, such as the control system 122 may control the dosing and injection process of the corrosion-inhibiting solution and the activator. That is, the control system 122 may perform one or more steps of the process 300. For example, the control system 122 may determine an injection schedule for the corrosion-inhibiting solution and the activator and control the injection process so that the corrosion-inhibiting solution and the activator are injected as desired. That is, the control system 122 may inject a portion of the corrosion-inhibiting solution at various time intervals based on an injection schedule (e.g., every 10 minutes for an hour). For example, because the fluid 224 may be continuously pumped into the tubing 208 for a set duration, the fluid 224 may be continuously introducing dissolved oxygen into the wellbore 204. As such, the control system 122 may dose the fluid 224 with the corrosion-inhibiting solution at time intervals over the duration that the fluid 224 is pumped into the tubing 208 to maintain a reduced dissolved oxygen concentration within the wellbore 204. Based on the time intervals of the corrosion-inhibiting solution injection, the control system 122 may inject the activator at a respective injection timeframe. As should be appreciated, even if an activator is not used, the control system 122 may control the injection of the corrosion-inhibiting solution, as described above, including maintaining the injection pressure and/or temperature.

In some embodiments, the control system 122 may continuously (or at set time intervals) monitor the dissolved oxygen concentration within the wellbore 204, as described above. Then based on the dissolved oxygen concentration, the control system 122 may dose and inject the corrosion-inhibiting solution in the wellbore 204. For example, the control system 122 may measure a first dissolved oxygen concentration in the wellbore 204 at a first time and then determine a first amount of corrosion-inhibiting agent required to fully consume the measure the first dissolved oxygen. A corrosion-inhibiting solution may be prepared with the first amount of corrosion-inhibiting agent and then corrosion-inhibiting solution may be injected into the wellbore 204. At a second time which is subsequent to the first time, the control system 122 may measure a second dissolved oxygen concentration in the wellbore 204. Then, based on the second dissolved oxygen concentration, a second amount of corrosion-inhibiting agent may be determined, and a respective corrosion-inhibiting solution prepared. The corrosion-inhibiting agent may then be injected into the wellbore 204. As can be appreciated, this process may be continuously performed throughout one or more processes performed at the oilfield system.

Once the corrosion-inhibiting agent is introduced into the wellbore 104, such as via the corrosion-inhibiting solution, the corrosion-inhibiting agent may reduce the overall corrosion rate to the well infrastructure. For example, the corrosion-inhibiting agent may reduce the corrosion rate within the wellbore 204, and related downstream components, to equal to or less than 0.05 lb/ft$^2$, 0.04 lb/ft$^2$, 0.03 lb/ft$^2$, 0.02 lb/ft$^2$, or 0.010 lb/ft$^2$. In an example embodiment, the corrosion-inhibiting agent achieves a corrosion rate of 0.023 lb/ft$^2$ at ambient conditions and 0.0044 lb/ft$^2$ when dissolved oxygen concentration approaches zero.

To achieve these reduced corrosion rates, the corrosion-inhibiting agent neutralizes dissolved oxygen present within the fluid 224, thereby reducing the dissolved oxygen concentration. In example embodiments, the corrosion-inhibiting agent reduces dissolved oxygen concentration to less than 10 ppm, less than 7 ppm, less than 5 ppm, less than 2 ppm, less than 1 ppm, less than 100 ppb, less than 50 ppb, or less than 10 ppb. As those skilled in the art readily appreciate, in some applications 50 ppb or less of oxygen may be a critical threshold for preventing corrosion due to dissolved oxygen (see e.g., NACE SP0499-2012). In other applications, the threshold may be as low as 10 ppb of dissolved oxygen (see e.g., NACE-2017-9062).

As is illustrated by the below examples, the corrosion-inhibiting agents are able to reduce the dissolved oxygen concentrations in less than 90 minutes, less than 60 minutes, less than 30 minutes, less than 20 minutes, or less than 10 minutes, depending on application, environment, selected corrosion-inhibiting agent, and composition of the corrosion-inhibiting solution. As can be appreciated, the quicker the response or onset time of the corrosion-inhibiting agents to neutralize the dissolved oxygen within the fluid 224, the less corrosive effects the fluid 244 will have on the metal infrastructure of the wellbore 204.

Referring now to FIG. 4, is a diagram of a system 400 configured to implement a method for introducing the corrosion-inhibiting agent into a wellbore, such as the wellbore 204, according to an embodiment herein. The system 400 may be an example of an apparatus including a computing apparatus 491 that is representative of any system or collection of systems in which the various processes, systems, programs, services, and scenarios disclosed herein may be implemented. For example, computing apparatus 491 may be an example control system, such as the control system 122 in the upstream oilfield system 100 of FIG. 1. Examples of computing apparatus 491 include, but are not limited to, server computers, desktop computers, laptop computers, routers, switches, web servers, cloud computing platforms, and data center equipment, as well as any other type of physical or virtual server machine, physical or virtual router, container, and any variation or combination thereof.

Computing apparatus 491 may be implemented as a single apparatus, system, or device or may be implemented in a distributed manner as multiple apparatuses, systems, or devices. Computing apparatus 491 may include, but is not limited to, processing system 496, storage system 493, software 495, communication interface system 497, and user interface system 499. Processing system 496 may be operatively coupled with storage system 493, communication interface system 497, and user interface system 499.

Processing system 496 may load and execute software 495 from storage system 493. Software 495 may include a corrosion-inhibiting process 492, which may be representative of any of the operations for providing a corrosion-inhibiting agent within an upstream oilfield system, such as the process 300, as discussed with respect to the preceding figures. When executed by processing system 496, software 495 may direct processing system 496 to operate as described herein for at least the various processes, such as the process 300, operational scenarios, and sequences discussed in the foregoing implementations. Computing apparatus 491 may optionally include additional devices, features, or functionality not discussed for purposes of brevity.

In some embodiments, processing system 494 may comprise a micro-processor and other circuitry that retrieves and executes software 495 from storage system 493. Processing system 496 may be implemented within a single processing device but may also be distributed across multiple processing devices or sub-systems that cooperate in executing program instructions. Examples of processing system 496 may include general purpose central processing units, graphical processing units, application specific processors, and logic devices, as well as any other type of processing device, combinations, or variations thereof.

Storage system 493 may comprise any memory device or computer-readable storage medium readable by processing system 496 and capable of storing software 495. Storage system 493 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer-readable storage medium a propagated signal.

In addition to computer-readable storage medium, in some implementations storage system 493 may also include computer readable communication media over which at least some of software 495 may be communicated internally or externally. Storage system 493 may be implemented as a single storage device but may also be implemented across multiple storage devices or sub-systems co-located or distributed relative to each other. Storage system 493 may comprise additional elements, such as a controller, capable of communicating with processing system 496 or possibly other systems.

Software 495 (including the process 492 among other functions) may be implemented in program instructions that may, when executed by processing system 496, direct processing system 496 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 495 may include additional processes, programs, or components, such as operating system software, virtualization software, or other application software. Software 495 may also comprise firmware or some other form of machine-readable processing instructions executable by processing system 496.

In general, software 495 may, when loaded into processing system 496 and executed, transform a suitable apparatus, system, or device (of which computing apparatus 491 is representative) overall from a general-purpose computing system into a special-purpose computing system as described herein. Indeed, encoding software 495 on storage system 493 may transform the physical structure of storage system 493. The specific transformation of the physical structure may depend on various factors in different implementations of this description. Examples of such factors may include, but are not limited to, the technology used to implement the storage media of storage system 493 and whether the computer-storage media are characterized as primary or secondary storage, as well as other factors.

For example, if the computer-readable storage medium are implemented as semiconductor-based memory, software 495 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 497 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between the computing apparatus 491 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

EXAMPLES

Aspects of the present disclosure are further illustrated by reference to the below examples. It will be apparent to one skilled in the art, that modifications to the materials and/or methods may be practiced without departing from the scope or spirit of the present disclosure herein.

Example 1

The purpose of this experiment was to monitor the impact of temperature and the impact of the presence of an activator on the oxygen scavenging capabilities of the corrosion-inhibiting agent.

To prepare the experiment, 500 mL of deionized water (saturated with dissolved oxygen) was placed in a 3-neck round bottom flask, and a calibrated dissolved oxygen probe was inserted into the center neck. FIG. 5 provides picture 500 of the experiment setup. The water was stirred magnetically, and the pH and temperature were adjusted to the indicated values. Temperature was controlled by heating in a water bath, and pH was adjusted to ~6.4 with dilute hydrogen chloride (HCl). The corrosion-inhibiting agent used was ascorbic acid and the activator, if used, was $CuSO_4 \cdot 5H_2O$. The corrosion-inhibiting agent and activator (if used) were injected via micropipette through one of the side necks in the flask. The corrosion-inhibiting agent was added until a 200-ppm concentration was achieved and the activator, when added, was added at a 1:20 ratio to the ascorbic acid to achieve 10 ppm concentration achieved. The flask was then sealed and dissolved oxygen was monitored continuously as a function of time.

Figure 6:
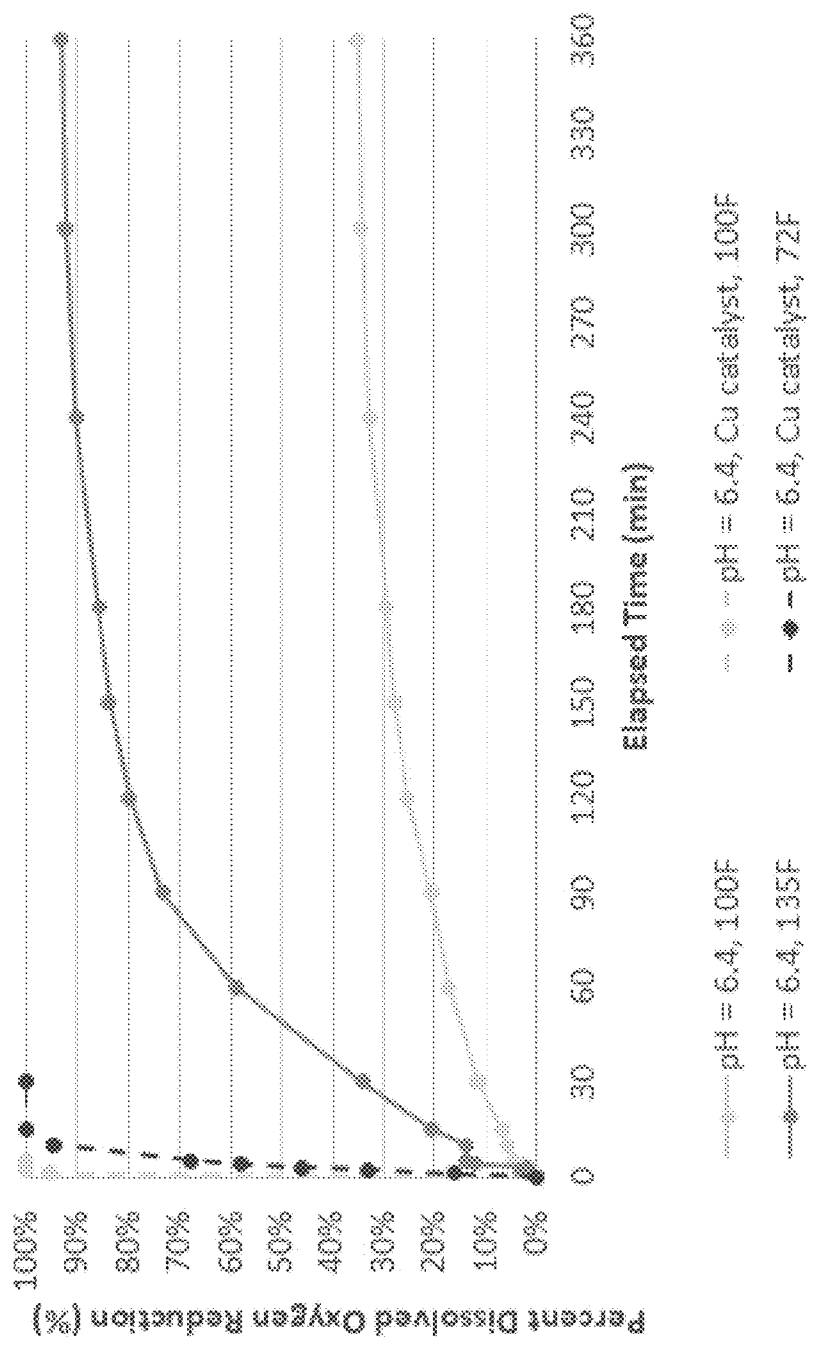
FIG. 6 provides a graph depicting results from tests performed as part of Example 1.

FIG. 6 provides graph 600 depicting the results of the 4 representative tests performed. As shown by the solid lines in the graph 600, there is evidence of a reaction between ascorbic acid and dissolved oxygen in the absence of activator and there is a moderate temperature dependence. However, these reactions are relatively sluggish due to the lack of an activator. The reaction between singlet scavenger molecules like ascorbic acid and triplet molecular oxygen is spin-forbidden, resulting in a pronounced kinetic barrier. Conversely, when a copper catalyst ($CuSO_4 \cdot 5H_2O$) was added to the reaction, there was a significant increase in reaction rate, as can be seen in the dashed lines in FIG. 6.

In the absence of catalyst, approximately 35% and 93% of the dissolved oxygen were scavenged at 100° F. and 135° F., respectively, after 6 h. In the presence of the activator, all detectable dissolved oxygen was scavenged at 100° F. within 2 minutes. Even at ambient temperature (72° F.), all detectable dissolved oxygen was scavenged within 15 minutes.

Examples 2-4

The purpose of these experiments was to monitor the impact of varying activator concentrations across a range of corrosion-inhibiting agents on the oxygen scavenging capabilities of the corrosion-inhibiting agent.

To prepare the experiments, 500 mL of deionized water (saturated with dissolved oxygen) was placed in a 3-neck round bottom flask, and a calibrated dissolved oxygen probe was inserted into the center neck for each test. The water was stirred magnetically and the temperature was maintained at 80° F. The temperature was controlled by heating in a water bath.

Figure 7:
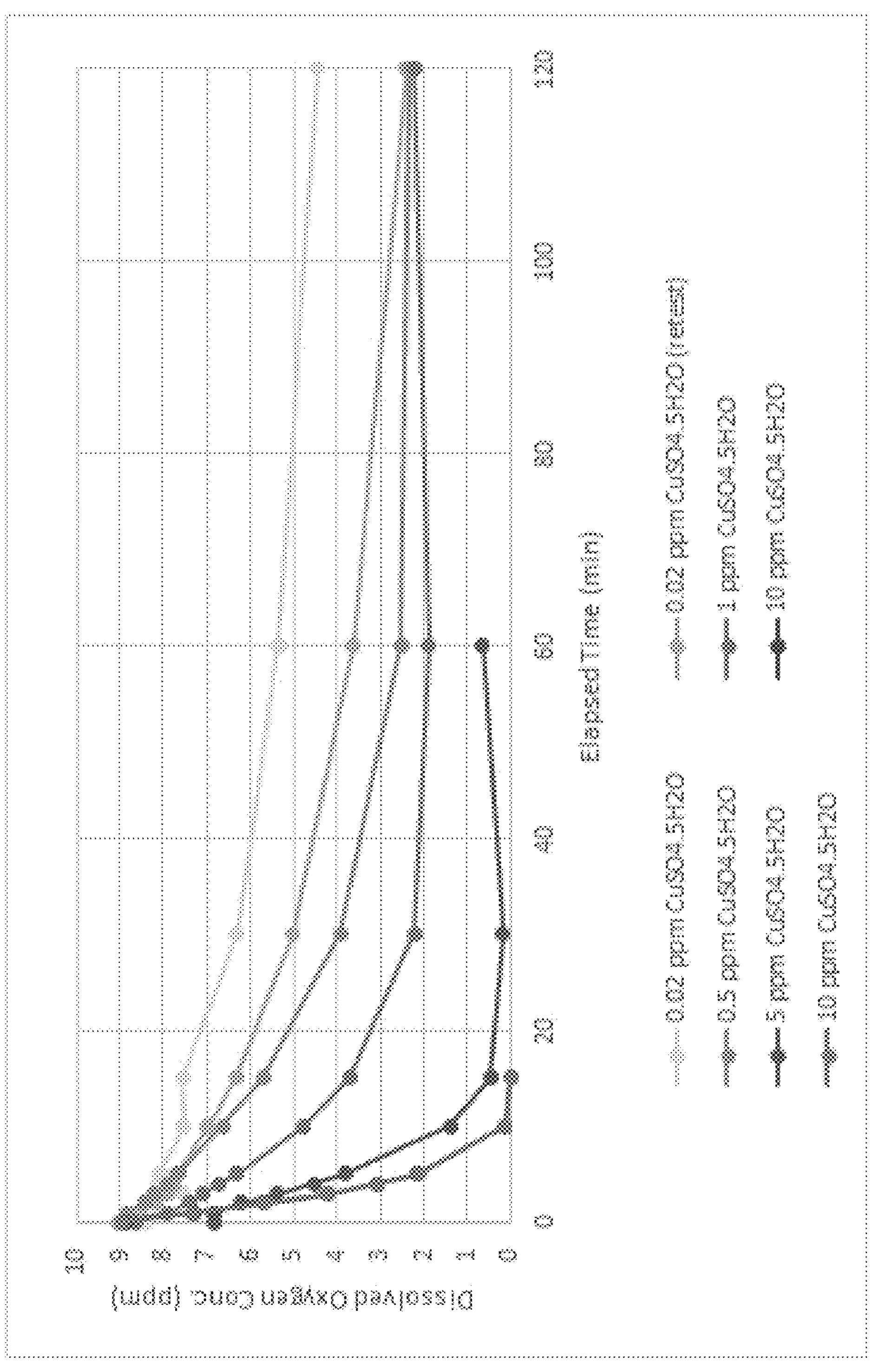
FIGS. 7-9 provide graphs depicting results from tests performed as part of Examples 2-4.
Figure 8:
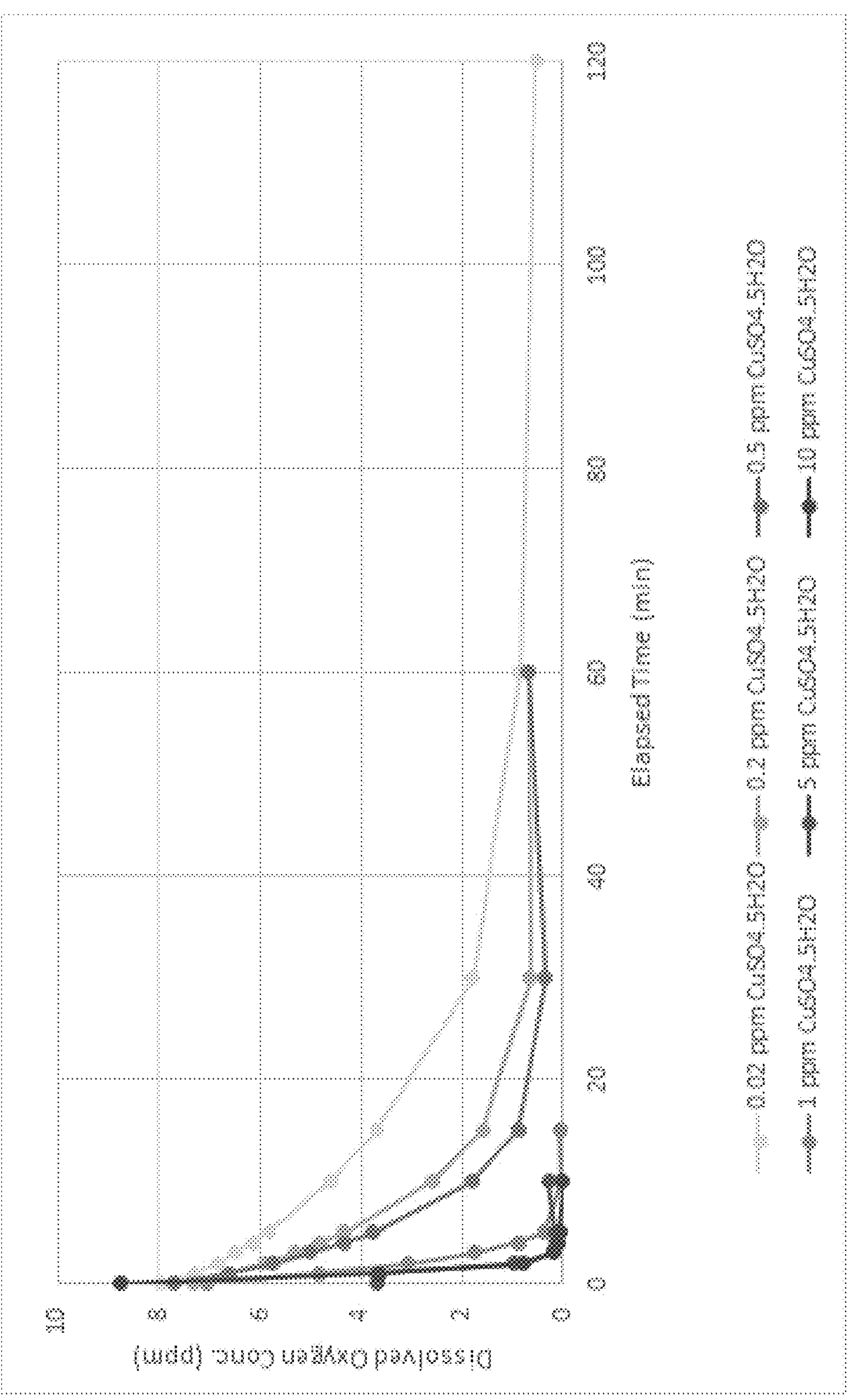
Figure 9:
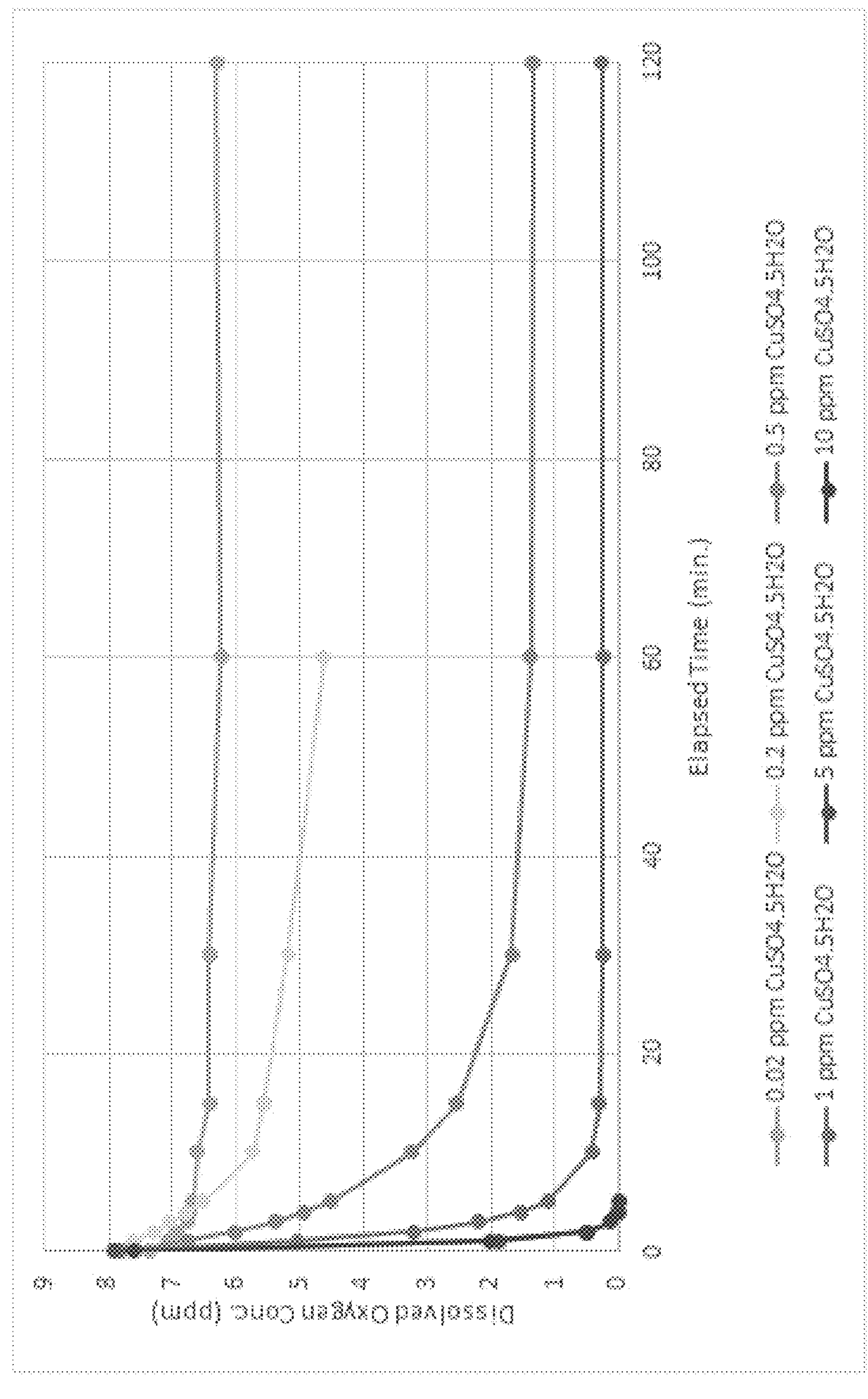

Each test used a different corrosion-inhibiting agent. The corrosion-inhibiting agents used were ascorbic acid, DEHA, and carbohydrazide, respectively, and the activator was $CuSO_4 \cdot 5H_2O$. The corrosion-inhibiting agent and activator were injected via micropipette through one of the side necks in the flask. The corrosion-inhibiting agent was added until a 100-ppm concentration was achieved. The activator was added at varying amounts to achieve the concentrations of each test, which include 0.02 ppm, 0.5 ppm, 1 ppm, 5 ppm, and 10 ppm. FIG. 7 provides graph 700 illustrating the results from the test in which the corrosion-inhibiting agent was ascorbic acid. FIG. 8 provides graph 800 illustrating the results from the test in which the corrosion-inhibiting agent was DEHA. FIG. 9 provides graph 900 illustrating the results from the test in which the corrosion-inhibiting agent was carbohydrazide.

As shown by each of the graphs 700, 800, and 900, oxygen scavenging occurs even at low catalyst concentrations (e.g., 0.02-0.5 ppm), however, the rate and overall extent of the reaction increases as the activator concentration increases.

Example 5

The purpose of this experiment was to monitor the impact of oxygen removal from a corrosive system. In particular, this experiment focused on the reduction in corrosion rate of P110 steel in the presence of a proprietary corrosion inhibitor (I-124G), both with and without dissolved oxygen.

To prepare the experiment, a P110 steel coupon was placed in a glass vessel filled with a diluted acid (Oil Safe AR) under ambient atmosphere and defined conditions (175° F. for 6 h). For a first test, the untreated coupon was left for 6 hours in the diluted acid. For the second test, the diluted acid was dosed with 0.25 gallons-per-thousand gallons (gpt) of I-124G. For the third, final test, the same test using 0.25 gpt of I-124G was conducted under oxygen-free conditions.

As shown by Table 2 below, under ambient atmosphere and defined conditions (175° F. for 6 h), the untreated coupon showed a corrosion rate of 0.090 lb/ft$^2$. When the diluted acid was dosed with 0.25 gpt of I-124G, the corrosion rate dropped to 0.0230 lb/ft$^2$ (a 74% reduction in corrosion rate, relative to the untreated sample), indicating the beneficial effect of using a corrosion inhibitor. However, when the same test using 0.25 gpt of I-124G was conducted under an oxygen-free atmosphere, the corrosion rate dropped to 0.0044 lb/ft$^2$; a reduction in corrosion rate of approximately 81%, relative to the corrosion rate under ambient atmosphere. This indicates that removal of oxygen from corrosive systems can have a positive impact on the overall corrosion behavior that is observed. This effect may be distinct from the benefit provided using corrosion inhibitors and the two approaches to corrosion control may be used separately or in tandem.

TABLE 2

| Corrosion Inhibitor | Corrosion Inhibitor Concentration (gpt) | Atmosphere | Corrosion Rate (lb/ft$^2$) |
|---|---|---|---|
| None (blank) | none | Ambient | 0.090 |
| I-124G | 0.25 | Ambient | 0.0230 |
| I-124G | 0.25 | Oxygen-Free | 0.0044 |

Example 6

The purpose of this experiment was to monitor the activation of a corrosion-inhibiting agent by various activators, including the presence of metal infrastructure.

Figure 10:
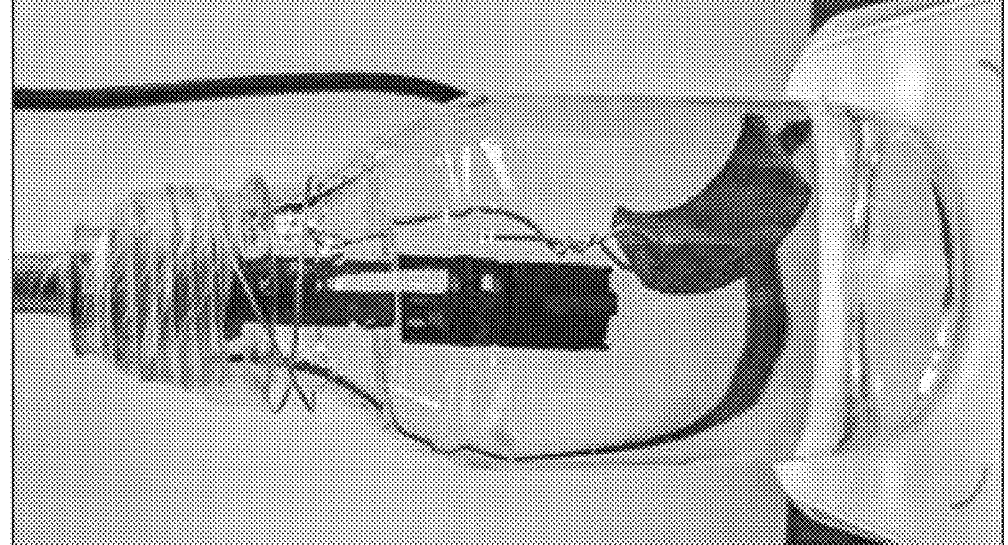
FIG. 10 provides a picture of an experimental setup for Example 6.

To prepare this experiment, a corrosion-inhibiting agent, here ascorbic acid, is injected into a glass vessel containing deionized water to a concentration of 200 ppm. For a first test, no steel coupon was present but for a second test, a P110 steel coupon was suspended in the water. The dissolved oxygen was measured as a function of time at room temperature (~70° F.) for both tests. FIG. 10 provides a picture 1000 of the second test in which the steel coupon was submerged in the deionized water within the glass vessel.

Figure 11:
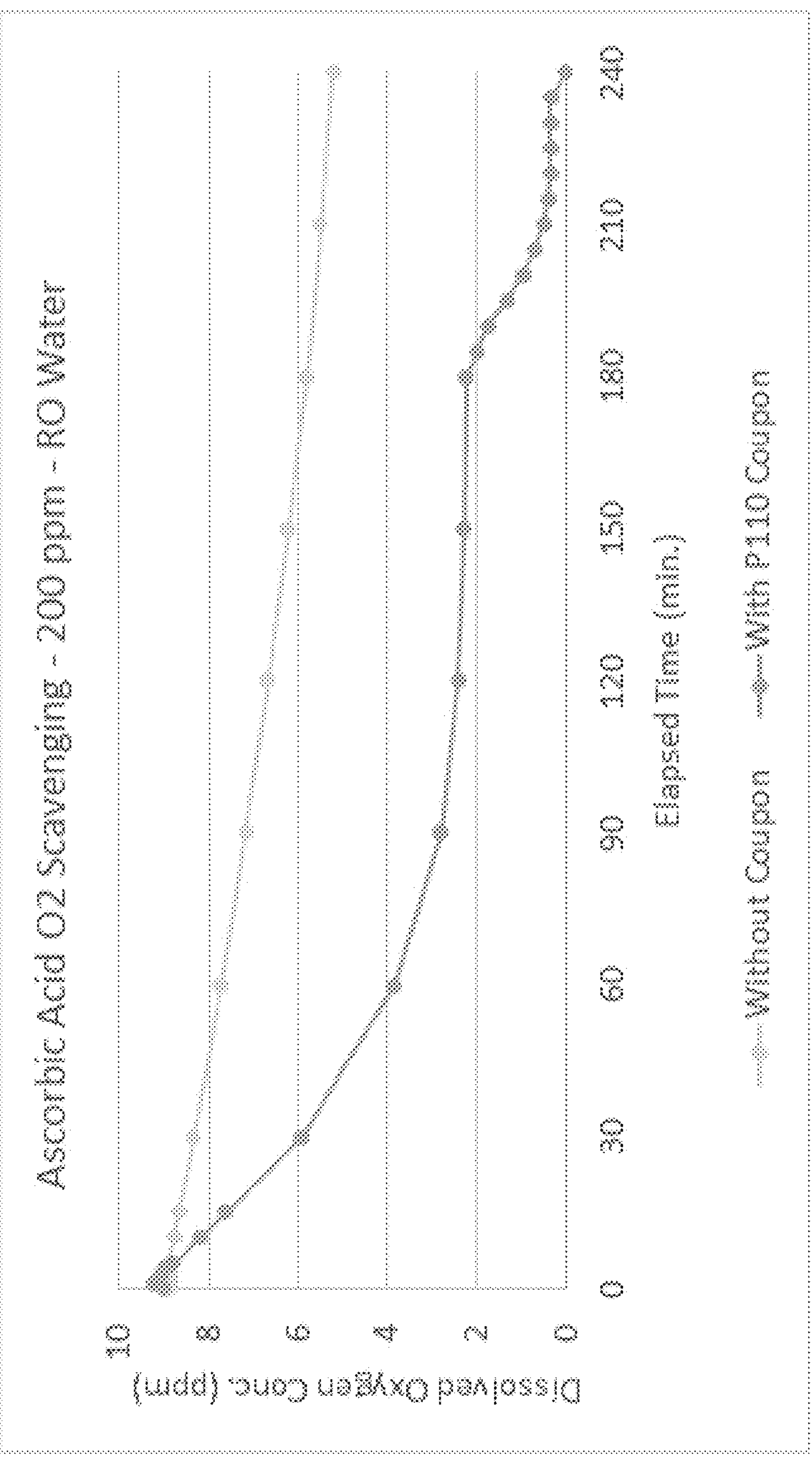
FIG. 11 provides a graph illustrating the results from tests performed as part of Example 6, according to an embodiment herein.

FIG. 11 provides graph 1100 illustrating the results from both tests. As can be seen from graph 1100, in the first test without the coupon, only a slow reaction was observed. Over a period of 4 h, the dissolved oxygen concentration dropped from 9.05 ppm to 5.23 ppm. However, when the coupon was present in the second test, the rate of reaction increased significantly. The scavenging reaction stalled after 180 min, which suggested that all of the catalytically active species had been consumed or deactivated, perhaps via passivation of the coupon surface.

At the 180 min mark, the temperature was increased from 70° F. to 100° F. in both tests. This boost in temperature initiated a further reduction in dissolved oxygen concentration which suggested that additional catalytic sites were activated by this increase in temperature, but there was still a detectable amount of dissolved oxygen left behind (~0.37 ppm). At the 235 min mark, a bolus of copper catalyst (10 ppm) was injected into the flask, and there was an immediate reduction in dissolved oxygen to non-detectable levels.

Collectively, the results from these two tests indicate the reactions were likely catalyst-limited (rather than scavenger-limited). Suitably high concentrations of catalyst/activator are needed to drive the scavenger reaction in reasonable time frames. Importantly, this test demonstrates that there are many potential sources of catalyst species, and the unique, high salinity environment of oil and gas wells may provide the necessary catalyst source. In some cases, the metals may originate from the geological formation that the well is drilled into; in other cases, the metals may originate from installed hardware, as suggested by the experiment conducted with the P110 steel coupon. Regardless of the precise source of the metal, a further external catalyst (e.g., copper) may not be necessary to activate the corrosion-inhibiting agent.

The foregoing examples and descriptions are described herein in the context of systems and methods for providing a corrosion-inhibiting agent. Those of ordinary skill in the art will realize that these descriptions are illustrative only and are not intended to be in any way limiting. Reference is made in detail to implementations of examples as illustrated in the accompanying drawings. The same reference indicators are used throughout the drawings and the description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. That is, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example, embodiment, or case means that a particular feature, structure, operation, or other characteristic described in connection with the example may be included in at least one implementation of the disclosure. The disclosure is not restricted to the particular examples or implementations described as such. The appearance of the phrases "in one example," "in an example," "in an embodiment," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for" but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

Aspects

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Aspects 1-4" is to be understood as "Aspect 1, 2, 3, or 4").

Aspect 1 is a method for inhibiting corrosion of metal infrastructure within a wellbore, the method comprising: providing a corrosion-inhibiting agent, wherein the corrosion-inhibiting agent, in some embodiments, is organic; dissolving the corrosion-inhibiting agent in a solvent to form a corrosion-inhibiting solution; and injecting the corrosion-inhibiting solution into a wellbore, wherein the corrosion-inhibiting solution: reduces an oxygen concentration within the wellbore to below 1 parts-per-million (ppm); and comprises a corrosion rate of equal to or less than 0.02 $lb/ft^2$.

Aspect 2 is the method of any previous or subsequent aspect, wherein the corrosion-inhibiting agent comprises one of ascorbic acid or a salt thereof, erythorbic acid or a salt thereof, diethylhydroxylamine (DEHA), methylethlketoxime (MEKO), hydroquinone (HQ), carbohydrazide, or a combination thereof.

Aspect 3 is the method of any previous or subsequent aspect, wherein providing the corrosion-inhibiting agent comprises: selecting the corrosion-inhibiting agent based on a pKa value of the corrosion-inhibiting agent, wherein the pKa value of the corrosion-inhibiting agent activates the corrosion-inhibiting agent in a neutral pH environment of the wellbore.

Aspect 4 is the method of any previous or subsequent aspect, wherein providing the corrosion-inhibiting agent comprises: selecting a corrosion-inhibiting agent based on one or more wellbore factors; and determining an amount of the corrosion-inhibiting to achieve a concentration of the corrosion-inhibiting agent in the corrosion-inhibiting solution within a range from 100 ppm to 300 ppm.

Aspect 5 is the method of any previous or subsequent aspect, wherein the method further comprises injecting an activator into the wellbore within an injection timeframe of injection of the corrosion-inhibiting agent.

Aspect 6 is the method of any previous or subsequent aspect, wherein the method further comprises: determining, by a control system associated with the wellbore, a first time for injecting the corrosion-inhibiting solution into the wellbore; determining, by the control system, an injection timeframe for injecting an activator into the wellbore based on the first time; determining, by the control system, a second time for injecting the activator into the wellbore based on the injection timeframe; injecting the corrosion-inhibiting solution into the wellbore at the first time; and injecting the activator into the wellbore at the second time, wherein the second time is time-delayed from the first time.

Aspect 7 is the method of any previous or subsequent aspect, wherein injecting the corrosion-inhibiting solution into the wellbore comprises injecting the corrosion-inhibiting solution into the wellbore at an injection pressure, wherein the injection pressure is equal to or greater than a wellbore pressure.

Aspect 8 is the method of any previous or subsequent aspect, wherein injecting the corrosion-inhibiting solution into the wellbore further comprises injecting an activator into the wellbore, wherein the activator comprises one or more of copper(II) chloride, copper(II) sulfate, iron(II) chloride, iron(III) chloride, iron(II) sulfate, iron(III) sulfate, nickel(II) chloride, nickel(II) sulfate, cobalt(II) chloride, or cobalt(II) sulfate.

Aspect 9 is the method of any previous or subsequent aspect, wherein the solvent comprises one of: methanol; ethylene glycol; water; isopropanol; EGMBE (Ethylene Glycol Monobutyl Ether); diethylene glycol; or diglyme.

Aspect 10 is the method of any previous or subsequent aspect, wherein the corrosion-inhibiting agent is a sulfur-free compound.

Aspect 11 is the method of any previous or subsequent aspect, wherein the wellbore comprises tubing, a casing, and an annulus formed between the tubing and the casing, and injecting the corrosion-inhibiting solution into the wellbore comprises injecting the corrosion-inhibiting solution into the tubing of the wellbore.

Aspect 12 is the method of any previous or subsequent aspect, wherein the wellbore comprises tubing, a casing, and an annulus formed between the tubing and the casing, and injecting the corrosion-inhibiting solution into the wellbore comprises injecting the corrosion-inhibiting solution into the annulus of the wellbore.

Aspect 13 is a system for inhibiting corrosion of metal infrastructure within an upstream oil system, wherein the upstream oil system comprises a wellbore, the system comprising: a corrosion-inhibiting agent, wherein the corrosion-inhibiting agent is organic; and a solvent suitable for injection into a wellbore, wherein the corrosion-inhibiting agent is dissolved in the solvent to form a corrosion-inhibiting solution that, when injected into the wellbore, reduces a dissolved oxygen concentration of fluids within the wellbore to or less than 1 ppm.

Aspect 14 is the system of any previous or subsequent aspect, wherein the corrosion-inhibiting agent comprises one of ascorbic acid or a salt thereof, erythorbic acid or a salt thereof, diethylhydroxylamine (DEHA), methylethlketoxime (MEKO), hydroquinone (HQ), carbohydrazide, sulfite, bisulfite, or thiosulfate.

Aspect 15 is the system of any previous or subsequent aspect, wherein the corrosion-inhibiting solution, when injected into the wellbore, comprises a corrosion rate at or less than 0.02 lb/ft2.

Aspect 16 is the system of any previous or subsequent aspect, wherein the corrosion-inhibiting solution comprises the corrosion-inhibiting agent at a concentration ranging from 100 ppm to 200 ppm.

Aspect 17 is the system of any previous or subsequent aspect, wherein the corrosion-inhibiting solution, when injected into the wellbore, reduces dissolved oxygen concentration within the wellbore by 90% in less than 20 minutes from injection.

Aspect 18 is the system of any previous or subsequent aspect, wherein the corrosion-inhibiting agent is an organic compound.

Aspect 19 is the system of any previous or subsequent aspect, wherein the system further comprises an activator, wherein the activator comprises one or more of copper(II) chloride, copper(II) sulfate, iron(II) chloride, iron(III) chloride, iron(II) sulfate, iron(III) sulfate, nickel(II) chloride, nickel(II) sulfate, cobalt(II) chloride, or cobalt(II) sulfate.

Aspect 20 is the system of any previous or subsequent aspect, wherein the system further comprises one or more film-forming corrosion inhibitor.

What is claimed is:

1. A method for inhibiting corrosion of metal infrastructure within a wellbore, the method comprising:

measuring an initial dissolved oxygen concentration of a fluid within the wellbore, wherein the initial dissolved oxygen concentration is in a range from 100 parts-per-billion (ppb) to 10 parts-per-million (ppm);

providing a corrosion-inhibiting agent, wherein the corrosion-inhibiting agent is an organic oxygen scavenger configured to chemically react with and neutralize dissolved oxygen in the fluid;

dissolving the corrosion-inhibiting agent in a solvent to form a corrosion-inhibiting solution compatible with a neutral to slightly acidic wellbore environment; and injecting the corrosion-inhibiting solution into the wellbore, wherein, within 90 minutes after injection of the corrosion-inhibiting solution, the corrosion-inhibiting solution reduces the dissolved oxygen concentration of the fluid within the wellbore from the initial dissolved oxygen concentration to below between 0.1 ppb to 50 ppb; and wherein, as a result of reducing the dissolved oxygen concentration of the fluid, the metal infrastructure exhibits a corrosion rate of equal to or less than 0.02 $lb/ft^2$ in the neutral to slightly acidic wellbore environment.

2. The method of claim 1, wherein the corrosion-inhibiting agent comprises one of ascorbic acid or a salt thereof, erythorbic acid or a salt thereof, diethylhydroxylamine (DEHA), methylethlketoxime (MEKO), hydroquinone (HQ), carbohydrazide, or a combination thereof.

3. The method of claim 1, wherein providing the corrosion-inhibiting agent comprises:

selecting the corrosion-inhibiting agent based on a pKa value of the corrosion-inhibiting agent, wherein the pKa value of the corrosion-inhibiting agent activates the corrosion-inhibiting agent in a neutral pH environment of the wellbore.

4. The method of claim 1, wherein providing the corrosion-inhibiting agent comprises:

selecting the corrosion-inhibiting agent based on one or more wellbore factors; and determining an amount of the corrosion-inhibiting agent to achieve a concentration of the corrosion-inhibiting agent in the corrosion-inhibiting solution within a range from 100 ppm to 300 ppm.

5. The method of claim 1, wherein the method further comprises injecting an activator into the wellbore concurrently with, or within 30 minutes after injection of the corrosion-inhibiting agent.

6. The method of claim 1, wherein the method further comprises:

determining, by a control system associated with the wellbore, a first time for injecting the corrosion-inhibiting solution into the wellbore;

determining, by the control system, a second time for injecting an activator into the wellbore based on the first time;

injecting the corrosion-inhibiting solution into the wellbore at the first time; and injecting the activator into the wellbore at the second time, wherein the second time is time-delayed from the first time.

7. The method of claim 1, wherein injecting the corrosion-inhibiting solution into the wellbore comprises injecting the corrosion-inhibiting solution into the wellbore at an injection pressure, wherein the injection pressure is equal to or greater than a wellbore pressure.

8. The method of claim 1, wherein injecting the corrosion-inhibiting solution into the wellbore further comprises injecting an activator into the wellbore, wherein the activator comprises one or more of copper(II) chloride, copper(II) sulfate, iron(II) chloride, iron(III) chloride, iron(II) sulfate, iron(III) sulfate, nickel(II) chloride, nickel(II) sulfate, cobalt (II) chloride, or cobalt(II) sulfate.

9. The method of claim 1, wherein the solvent comprises one of:

methanol;
ethylene glycol;
water;
isopropanol;
EGMBE (Ethylene Glycol Monobutyl Ether);
diethylene glycol; or
diglyme.

10. The method of claim 1, wherein the corrosion-inhibiting agent is a sulfur-free compound.

11. The method of claim 1, wherein the wellbore comprises tubing, a casing, and an annulus formed between the tubing and the casing, and injecting the corrosion-inhibiting solution into the wellbore comprises injecting the corrosion-inhibiting solution into the tubing of the wellbore.

12. The method of claim 1, wherein the wellbore comprises tubing, a casing, and an annulus formed between the tubing and the casing, and injecting the corrosion-inhibiting solution into the wellbore comprises injecting the corrosion-inhibiting solution into the annulus of the wellbore.

13. A system for inhibiting corrosion of metal infrastructure within an upstream oil system, wherein the upstream oil system comprises a wellbore, the system comprising:

a corrosion-inhibiting agent, wherein the corrosion-inhibiting agent is an organic oxygen scavenger configured to chemically react with and neutralize dissolved oxygen; and a solvent for injection into a wellbore, wherein the corrosion-inhibiting agent is dissolved in the solvent to form a corrosion-inhibiting solution that, when injected into the wellbore:

(i) reduces a dissolved oxygen concentration of fluids within the wellbore from an initial concentration in a range from 100 parts-per-billion (ppb) to 10 parts-per-million (ppm) to a concentration between 0.1 ppb and 50 ppb within 90 minutes;

(ii) is compatible with a neutral to slightly acidic wellbore environment; and (iii) reduces a corrosion rate of the metal infrastructure to 0.02 lb/ft$^2$ or less.

14. The system of claim 13, wherein the corrosion-inhibiting agent comprises one of ascorbic acid or a salt thereof, erythorbic acid or a salt thereof, diethylhydroxylamine (DEHA), methylethlketoxime (MEKO), hydroquinone (HQ), carbohydrazide, sulfite, bisulfite, or thiosulfate.

15. The system of claim 13, wherein the corrosion-inhibiting solution comprises the corrosion-inhibiting agent at a concentration ranging from 100 ppm to 200 ppm.

16. The system of claim 13, wherein the corrosion-inhibiting solution, when injected into the wellbore, reduces a dissolved oxygen concentration of fluids within the wellbore by 90% in less than 20 minutes from injection.

17. The system of claim 13, wherein the organic oxygen scavenger is an organic, sulfur-free oxygen scavenger-compound.

18. The system of claim 13, wherein the system further comprises an activator, wherein the activator comprises one or more of copper(II) chloride, copper(II) sulfate, iron(II) chloride, iron(III) chloride, iron(II) sulfate, iron(III) sulfate, nickel(II) chloride, nickel(II) sulfate, cobalt(II) chloride, or cobalt(II) sulfate.

19. The system of claim 13, wherein the system further comprises one or more film-forming corrosion inhibitor.

* * * * *